(12) United States Patent
Stone

(10) Patent No.: US 8,203,229 B2
(45) Date of Patent: Jun. 19, 2012

(54) AUXILIARY DRIVE/BRAKE SYSTEM FOR A WIND TURBINE

(75) Inventor: Richard Stone, Teaneck, NJ (US)

(73) Assignee: Challenger Design, LLC, Hasbrouk Heights, NJ (US)

( * ) Notice: Subject to any disclaimer, the term of this patent is extended or adjusted under 35 U.S.C. 154(b) by 20 days.

(21) Appl. No.: 12/662,983

(22) Filed: May 14, 2010

(65) Prior Publication Data
US 2010/0314873 A1   Dec. 16, 2010

Related U.S. Application Data

(63) Continuation-in-part of application No. 12/457,531, filed on Jun. 15, 2009.

(51) Int. Cl.
*F03D 9/00* (2006.01)
*H02P 9/04* (2006.01)
*F01C 13/00* (2006.01)
*F01D 15/10* (2006.01)

(52) U.S. Cl. .............................. 290/55; 290/4 R; 290/44

(58) Field of Classification Search .................. 290/4 R, 290/44, 55
See application file for complete search history.

(56) References Cited

U.S. PATENT DOCUMENTS

| | | | | |
|---|---|---|---|---|
| 3,477,013 A * | 11/1969 | Smith | ............... | 322/4 |
| 4,119,837 A * | 10/1978 | Sheldon et al. | ............... | 377/17 |
| 4,128,888 A * | 12/1978 | Sheldon et al. | ............... | 702/9 |
| 4,139,891 A * | 2/1979 | Sheldon et al. | ............... | 702/9 |
| 4,186,312 A * | 1/1980 | Dvorak | ............... | 290/4 R |
| 4,187,546 A * | 2/1980 | Heffernan et al. | ............... | 700/304 |
| 4,357,542 A * | 11/1982 | Kirschbaum | ............... | 290/44 |
| 4,490,093 A * | 12/1984 | Chertok et al. | ............... | 416/26 |
| 4,556,801 A | 12/1985 | Gervasio et al. | ............... | 290/44 |
| 4,613,763 A | 9/1986 | Swansen | ............... | 290/44 |
| 4,774,855 A * | 10/1988 | Murrell et al. | ............... | 475/31 |
| 6,798,079 B2 * | 9/2004 | Nelson et al. | ............... | 290/2 |
| 6,943,469 B2 * | 9/2005 | Nelson | ............... | 310/55 |
| 7,114,527 B2 * | 10/2006 | Von Zwehl et al. | ............... | 139/1 E |
| 7,273,122 B2 * | 9/2007 | Rose | ............... | 180/165 |
| 7,449,794 B2 | 11/2008 | Guey et al. | ............... | 290/44 |
| 7,456,510 B2 | 11/2008 | Ito et al. | ............... | 290/44 |
| 7,615,884 B2 * | 11/2009 | McMaster | ............... | 290/55 |
| 7,841,432 B2 * | 11/2010 | Lynn et al. | ............... | 180/65.21 |
| 7,898,211 B2 * | 3/2011 | Takeuchi | ............... | 318/811 |

(Continued)

FOREIGN PATENT DOCUMENTS

JP   2008-025433   7/2008

*Primary Examiner* — Pedro J Cuevas
(74) *Attorney, Agent, or Firm* — Archer & Greiner, PC; Arnold D. Litt

(57) ABSTRACT

An auxiliary drive/brake system for a wind turbine includes an impulse, high torque motor, a gearbox transmission, a drive shaft, and a transfer gearbox that connects to either the wind turbine low-speed shaft or to the wind turbine gearbox. Control of the auxiliary drive/brake system is performed by a programmable computer-based motor drive control system in combination with instrumentation and sensors fitted to the rotating wind turbine components. Torque and horsepower created by the present auxiliary drive/brake system is transferred into the wind turbine low-speed shaft where it combines with the torque and horsepower created by the wind acting on the wind turbine rotor blades, the combined torque and horsepower is transferred from the wind turbine low-speed shaft into the wind turbine gearbox and the wind turbine generator, causing the wind turbine generator to operate and produce electricity which is supplied to the power company.

19 Claims, 12 Drawing Sheets

U.S. PATENT DOCUMENTS

| | | | |
|---|---|---|---|
| 7,913,791 B2* | 3/2011 | Rose et al. | 180/165 |
| 7,956,485 B1* | 6/2011 | Simnacher | 290/55 |
| 8,118,542 B2* | 2/2012 | Damgaard et al. | 415/124.1 |
| 2004/0007878 A1* | 1/2004 | Nelson et al. | 290/2 |
| 2004/0084974 A1* | 5/2004 | Nelson | 310/58 |
| 2005/0178457 A1* | 8/2005 | Von Zwehl et al. | 139/55.1 |
| 2006/0068970 A1* | 3/2006 | Rose | 477/34 |
| 2007/0216164 A1 | 9/2007 | Rivas et al. | 290/44 |
| 2007/0273336 A1 | 11/2007 | Davis | 322/22 |
| 2008/0066569 A1 | 3/2008 | Henenberger | 74/434 |
| 2008/0258473 A1* | 10/2008 | McMaster | 290/4 R |
| 2009/0001913 A1* | 1/2009 | Takeuchi et al. | 318/400.04 |
| 2009/0009118 A1* | 1/2009 | Takeuchi et al. | 318/400.38 |
| 2009/0058338 A1* | 3/2009 | Takeuchi | 318/400.13 |
| 2010/0109337 A1 | 5/2010 | Wang et al. | 290/55 |
| 2010/0137092 A1* | 6/2010 | Weichbold et al. | 475/31 |
| 2010/0314873 A1* | 12/2010 | Stone | 290/44 |
| 2010/0327786 A1* | 12/2010 | Aoki et al. | 318/400.04 |
| 2011/0115422 A1* | 5/2011 | Takeuchi | 318/400.13 |
| 2011/0243706 A1* | 10/2011 | Damgaard et al. | 414/800 |
| 2011/0268555 A1* | 11/2011 | Neumann | 415/2.1 |

* cited by examiner

Graph #1
Power/Wind Speed Curve Of The Typical 1.5 MW Wind Turbine During The Ramp Up/Ramp Down Period Of Operation Graph #3
Torque Required By ADBS High Torque Motor To Increase The Speed (Rpm) Of The Wind Turbine Rotor Blade Assembly From 6 To 10 Rpm During The Ramp Up/Ramp Down Period Of Operation

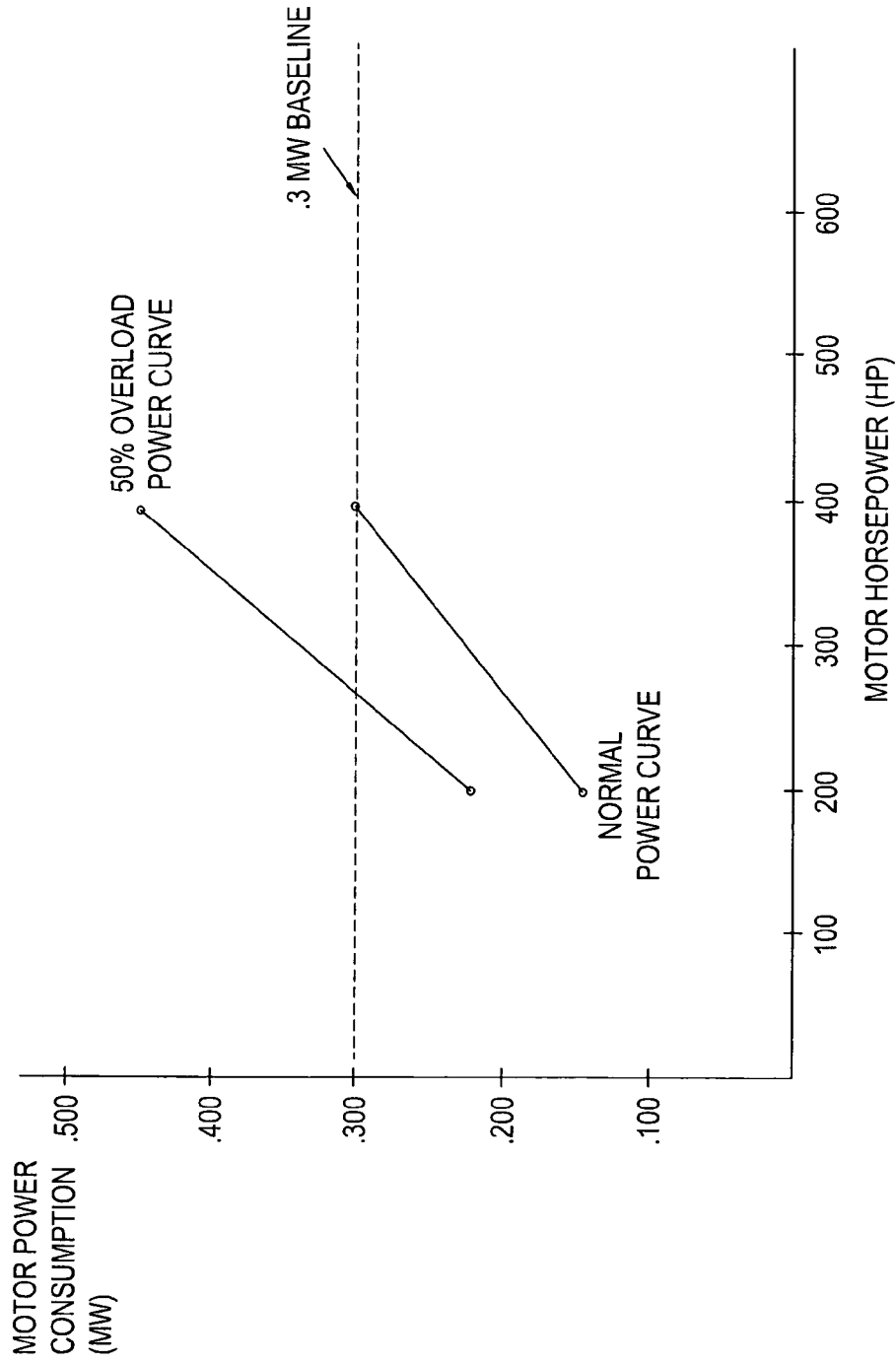

AUXILIARY DRIVE/BRAKE SYSTEM FOR A WIND TURBINE

CROSS REFERENCE TO RELATED APPLICATION

This application is a continuation-in-part of U.S. patent application Ser. No. 12/457,531, entitled "AUXILIARY DRIVE/BRAKE SYSTEM FOR A WIND TURBINE", filed Jun. 15, 2009, which is currently pending.

BACKGROUND OF THE INVENTION

1. Field of the Invention

The present invention relates to wind turbines. More particularly, the invention relates to an auxiliary drive/brake system for use in conjunction with a wind turbine.

2. Description of the Related Art

A wind turbine is not generally a reliable method for electricity generation because it depends entirely on the presence and strength of the wind in order to operate. Wind turbines cannot generate electricity when the wind speed is too low, the wind is intermittent, the wind speed drops rapidly and suddenly, or the wind speed is too high. The variable and random nature of the wind makes it difficult for power companies to use wind turbines for reliable electricity generation because changes to the wind create an immediate change in the amount of electricity available for transmission.

The greatest problem is when the wind speed drops rapidly and suddenly and forces multiple wind turbines to stop producing electricity. The resulting rapid and immediate drop in electricity output causes a large shortage of electricity that power companies must replace quickly in order to avoid creating a blackout or a brownout of its customers as well as overload damage of its electricity transmission system.

As shown with reference to Graph #1 shown in FIG. 10, a conventional 1.5 MW wind turbine for this example is capable of producing its nameplate (100% full load rating) of electricity only when the wind speed is sufficient to keep the wind turbine rotor blades 7 operating above 10 rpm. The minimum wind speed value required for 100% full load rating is 25 mph.

When the wind speed drops below 25 mph it causes the wind turbine rotor blades 7 speed (rpm) to fall below 10 rpm. This speed reduction causes the quantity of electricity the wind turbine 200 can generate to decrease rapidly because the power curve enters into the ramp up/ramp down period of operation (4 to 10 rpm).

The power curve for the ramp up/ramp down period of operation has a steep slope and demonstrates that when the wind speed falls by 50% from the full load value (25 mph/2=12.5 mph) the wind turbine can lose 80% of its generation ability (12.5 mph correlates to 0.27 MW As those skilled in the art will certainly appreciate, and with reference to FIG. 1 the basic wind turbine is composed of wind turbine rotor blades 7 connected to the wind turbine low-speed shaft 8. The wind turbine low-speed shaft 8 drives the wind turbine gearbox 9 by means of the input shaft 10 of the wind turbine gearbox 9. The output shaft 11 of the wind turbine gearbox 9 drives the wind turbine high-speed shaft 12. The wind turbine high-speed shaft 12 connects to the input shaft 13 of the wind turbine generator 14. The wind turbine generator 14 produces the electricity that is supplied to the electricity transmission network of the power company. The wind turbine rotor blades 7 are powered by wind only. This restricts the wind turbine generator 14 because the wind turbine generator 14 can only produce electricity when wind is available to turn the wind turbine rotor blades 7 at the required rpm (shaft speed).

The yaw control mechanism rotor blades 31 are used to position the wind turbine rotor blades 7 to further engage or disengage the wind, and the input shaft brake mechanism 33, provided the wind turbine is equipped with it, is used to slow the wind turbine low-speed shaft 8 and the wind turbine rotor blades 7 if these rotate above the maximum allowable rpm (shaft speed). The wind turbine gearbox 9 and the wind turbine generator 14 are installed on the base plate 20. The base plate 20 is attached to the wind turbine tower 22 by the rotating joint 21. The rotating joint 21 allows the wind turbine to rotate in the horizontal plane (yaw) about the wind turbine tower 22 whenever the wind changes direction. The wind turbine nacelle 37 covers and protects the internal components of the wind turbine.

As discussed above, current wind turbines are not generally reliable for use in electricity generation because they depend entirely on the presence and strength of the wind in order to operate. As result, a need exists for a mechanism by which wind turbines may be used in a variety of wind conditions so as to make them commercially feasible for implementation by power companies.

SUMMARY OF THE INVENTION

It is, therefore, an object of the present invention to provide an auxiliary drive/brake system for a wind turbine. The wind turbine includes wind turbine rotor blades connected to a wind turbine low-speed shaft. The wind turbine low-speed shaft drives a wind turbine gearbox via an input shaft of the wind turbine gearbox, an output shaft of the wind turbine gearbox and a wind turbine high speed shaft which connects to an input shaft of the wind turbine generator that produces electricity that is supplied to a power company electricity transmission network. The auxiliary drive/brake system includes a high torque motor connected to a motor drive control system which controls the high torque motor. The auxiliary drive/brake system includes a gearbox transmission, a drive shaft, and a transfer gearbox that connects to either the wind turbine low-speed shaft or to the wind turbine gearbox. The control of the auxiliary drive/brake system is performed by a computer programmable-based motor drive control system. Torque and horsepower created by the present auxiliary drive/brake system is transferred into the wind turbine low-speed shaft where it combines with the torque and horsepower created by the wind acting on the wind turbine rotor blades. The combined torque and horsepower is transferred from the wind turbine low-speed shaft into the wind turbine gearbox and the wind turbine generator, causing the wind turbine generator to operate and produce electricity which is supplied to the power company.

It is also an object of the present invention to provide an auxiliary drive/brake system for a wind turbine including a dynamic braking system.

It is another object of the present invention to provide an auxiliary drive/brake system for a wind turbine including either a battery or capacitor storage system powering the high toque motor.

It is a further object of the present invention to provide an auxiliary drive/brake system for a wind turbine including a clutch assembly.

It is also an object of the present invention to provide an auxiliary drive/brake system for a wind turbine wherein the gearbox transmission is a gearbox using fixed ratio gearing.

It is another object of the present invention to provide an auxiliary drive/brake system for a wind turbine wherein the transfer gearbox is connected to the wind turbine low-speed shaft by a first drive coupling and an opposite side of the transfer gearbox is attached to the input shaft of the wind turbine gearbox by the second drive coupling.

It is a further object of the present invention to provide an auxiliary drive/brake system for a wind turbine wherein the transfer gearbox is built directly into the gearbox transmission.

It is also an object of the present invention to provide an auxiliary drive/brake system for a wind turbine wherein the transfer gearbox is built directly into the wind turbine gearbox.

It is another object of the present invention to provide an auxiliary drive/brake system for a wind turbine wherein the motor drive control system controls the high torque motor.

It is a further object of the present invention to provide an auxiliary drive/brake system for a wind turbine wherein the motor drive control system is a programmable computer-based motor drive control system and controls the high torque motor.

It is also an object of the present invention to provide an auxiliary drive/brake system for a wind turbine wherein the motor drive control system uses feedback based upon instrumentation.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 10-13 respectively show Graphs #1, #2, #3 and #4 illustrating the performance of a typical 1.5 MW wind turbine and of the auxiliary drive/brake system when it is fitted to this typical 1.5 MW wind turbine.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to the various embodiments disclosed herein, an auxiliary drive/brake system ("ADBS") 100 for a wind turbine 200 is disclosed. Although the present auxiliary drive/brake system 100 is disclosed in accordance with a preferred wind turbine 200 for the purpose of disclosing the invention, it will be appreciated that it is contemplated the present auxiliary drive/brake system 100 may be utilized in conjunction with a variety of wind turbine designs.

The present auxiliary drive/brake system 100 improves a range of operations for the wind turbine 200. For example, when the wind speed is too intermittent to enable normal wind only operation, when the wind speed drops rapidly below the wind speed required for reliable wind only operation, or when the wind speed exceeds the maximum allowable wind speed, the present auxiliary drive/brake system 100 enables the wind turbine 200 to remain in operation and generate electricity.

Figure 1:
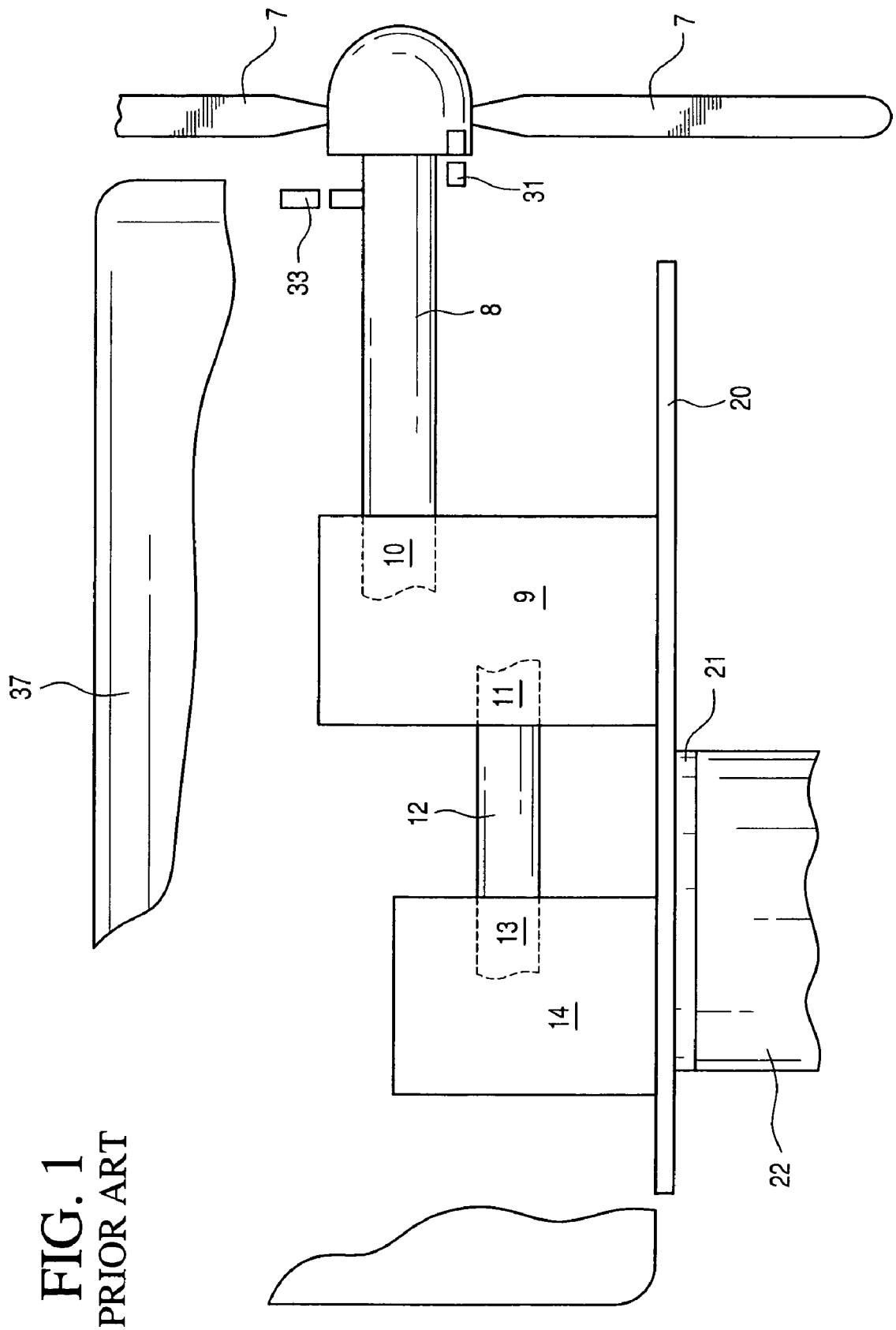
FIG. 1 is a schematic of a conventional wind turbine as known in the prior art.
Figure 2:
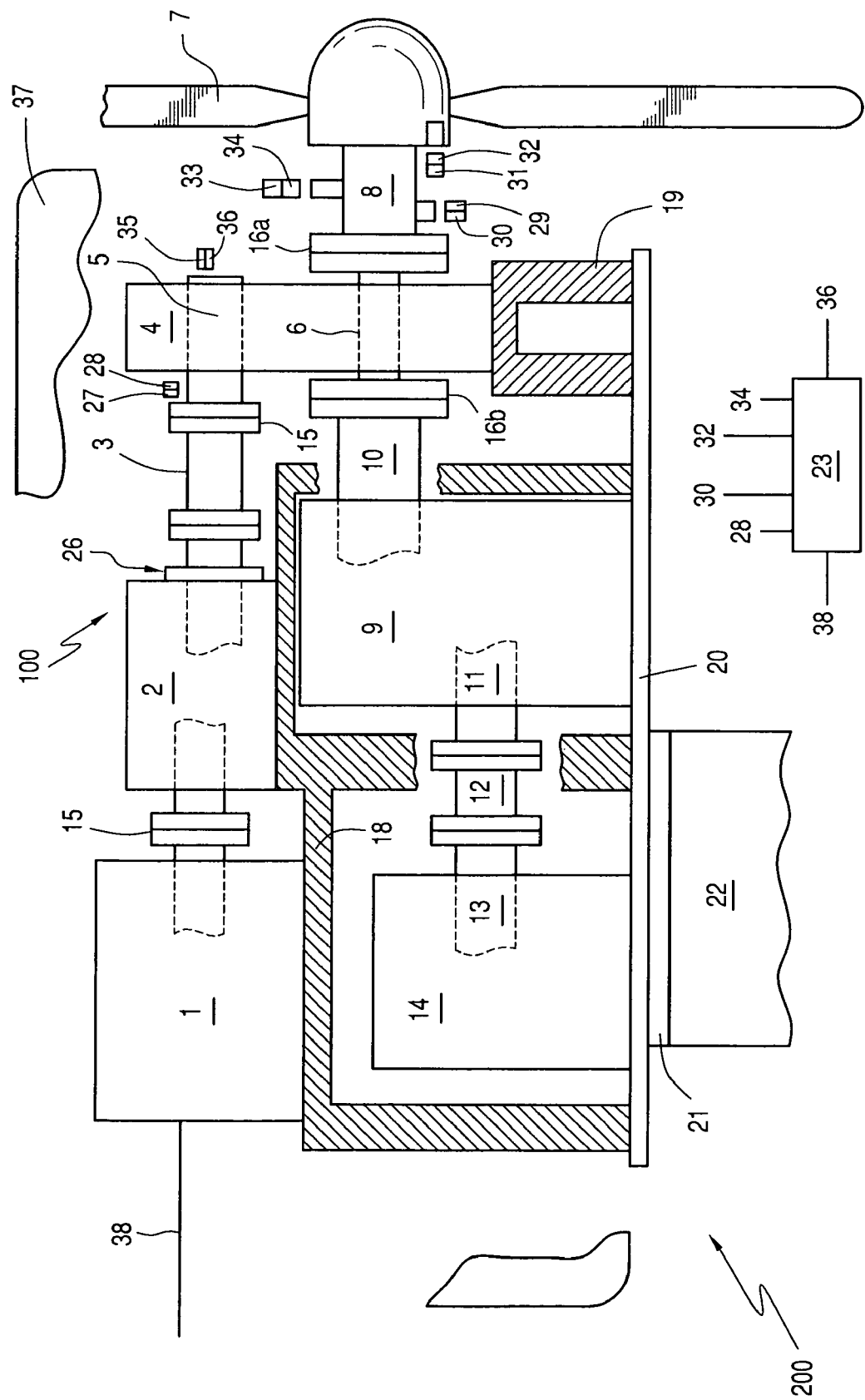
FIGS. 2, 3, 4, 7, 8 and 9 are schematics of a wind turbine employing the present auxiliary drive/brake system in accordance with various embodiments of the present invention.
Figure 3:
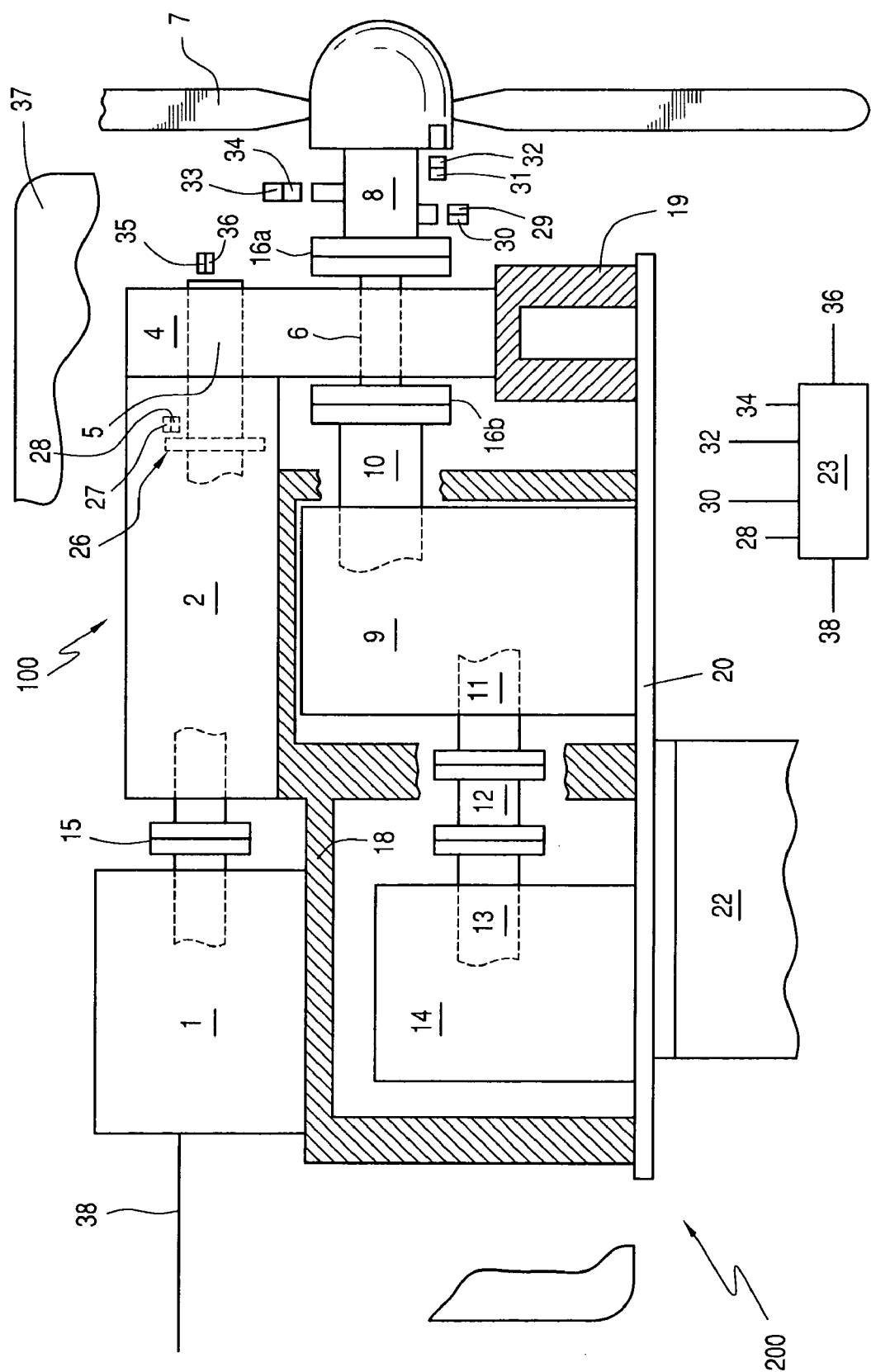
Figure 4:
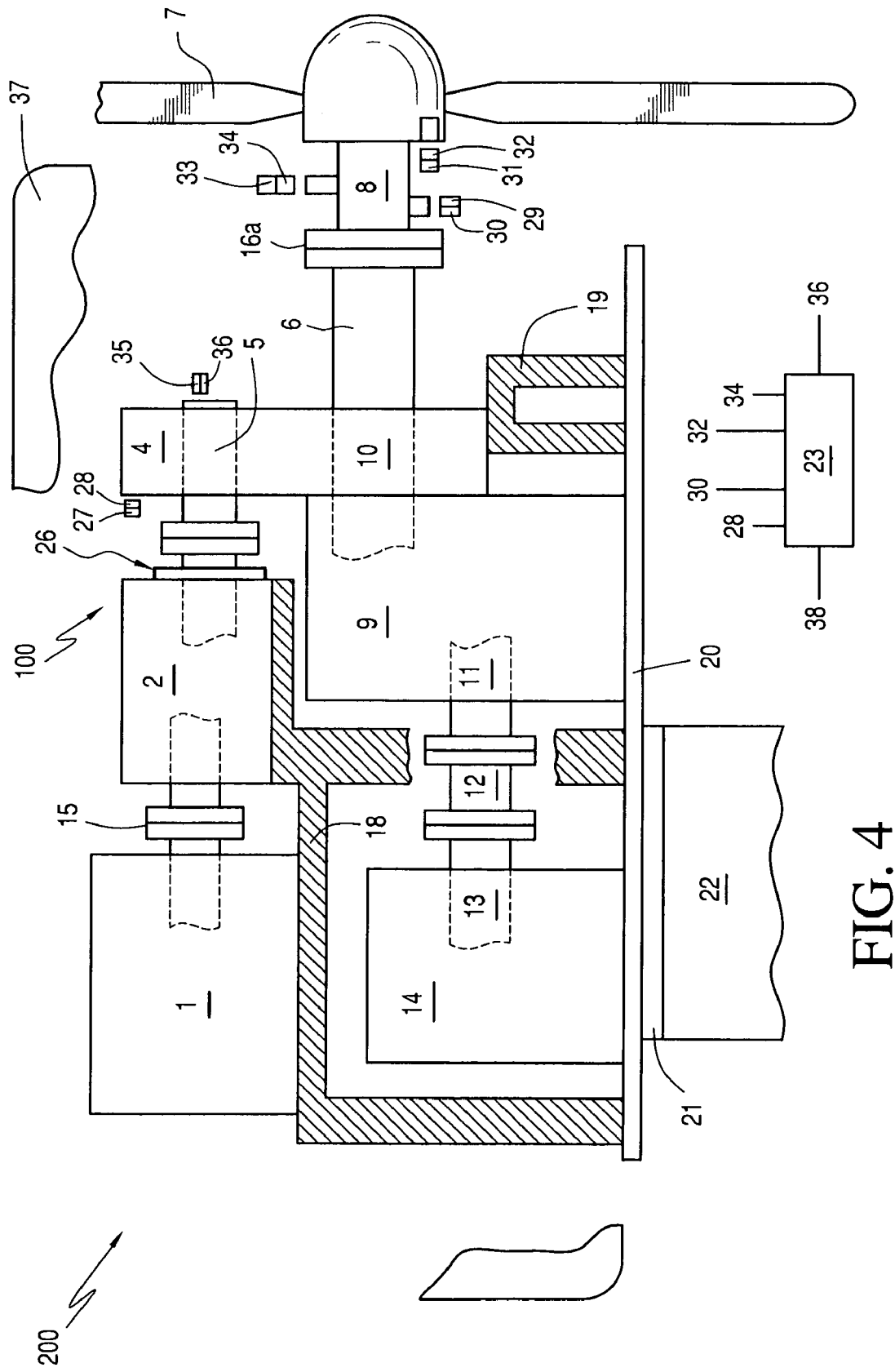

Briefly, and as will be discussed below in greater detail, the present auxiliary drive/brake system 100 includes a high torque motor 1, a gearbox/transmission 2, a driveshaft 3, a transfer gearbox 4, support frame 18, 19 and a motor drive control system 23. In accordance with the various embodiments disclosed herein, the transfer gearbox 4 connects to either the wind turbine low-speed shaft 8 (see embodiments shown with reference to FIGS. 2, 3, 8 and 9) or to the wind turbine gearbox 9 (see FIG. 4). The wind turbine low-speed shaft 8 is the input shaft that connects the wind turbine rotor blade assembly 7 to the wind turbine gearbox 9. The wind turbine gearbox 9 connects to and operates the wind turbine generator 14. The support frame 18, 19 is a separate steel support structure that supports the drive train components on the wind turbine 200. The motor drive control system 23 controls the high torque motor 1.

The present auxiliary drive/brake system 100 defines an independent drive train that connects the auxiliary drive/brake system 100 to the wind turbine 200 connecting the transfer gearbox 4 to either the wind turbine low-speed shaft 8 or the wind turbine gearbox 9. The control of the auxiliary drive/brake system 100 is performed by the motor drive control system 23.

Whether the high torque motor 1 is electrically powered (see FIGS. 2, 3 and 4) or hydraulically powered (see FIGS. 8 and 9), the high torque motor 1 is powered via the power supply line 38 connected to a separate power source (not shown). All power supply lines 38 that power the high torque motor 1 are arranged to rotate with the wind turbine nacelle 37 when it rotates (yaws) about the wind turbine tower 22 whenever the wind changes direction. This is a separate power source and is not connected to the electricity generated by the wind turbine 200. The type of power the power supply line 38 supplies to the high torque motor 1 is dependent on the type of high torque motor 1 used. The types of power include electricity, hydraulic fluid and compressed gas, in addition to other types known to those skilled in the art.

The high torque motor 1 drives the ADBS gearbox/transmission 2, the ADBS driveshaft 3 and the ADBS transfer gearbox 4. The torque and horsepower created are transferred into the wind turbine low-speed shaft 8 where it combines with the torque and horsepower created by the wind acting on the wind turbine rotor blade assembly 7. The combined torque and horsepower created by the auxiliary drive/brake system 100 are transferred from the wind turbine low-speed shaft 8 into the wind turbine gearbox 9 and the wind turbine generator 14. This causes the wind turbine generator 14 to operate and produce electricity in the normal manner for an extended period of time. The electricity is supplied to the power company by the existing electricity transmission line network.

The methods of operation by which the auxiliary drive/brake system 100 can power the wind turbine 200 to keep it in operation include "impulse operation" using multiple long or short duration power "impulses", steady state operation using continuous steady-state power, and acceleration to a required speed (rpm) using power provided at a controlled rate of acceleration.

As discussed above, an impulse method of operation may be employed in accordance with a preferred embodiment of the present invention. The "impulse method" of operation consists of operating the high torque motor 1 in a repeated "start-stop" manner to provide multiple long duration or short duration power "impulses" into the wind turbine rotor blade assembly 7. The value of the torque and horsepower created by each "impulse" equals a low proportion (10%-30%) of the total of the torque and horsepower required to operate the wind turbine.

The multiple power "impulses", in combination with power created by the remaining low speed wind, keep the wind turbine rotor blade assembly 7 turning at a high enough speed to enable the wind turbine generator 14 to continue to produce electricity. The actual speed increase of the wind turbine rotor blade assembly 7 created by the "impulses" is in the range of 2-4 rpm above the wind turbine "cut out speed" (the minimum rpm required by the wind turbine to remain in operation).

Each power "impulse" is created when the high torque motor 1 is started and brought up to operating speed. The time period of each "impulse" can range from several seconds to several minutes depending on the speed and wind conditions present when the auxiliary drive/brake system 100 is activated. The time period is determined based on the combined polar moment of inertia of the wind turbine rotor blade assembly 7 and wind turbine generator 14, the allowable rate of acceleration of the wind turbine rotor blade assembly 7, the design and power of the high torque motor 1 and the gear ratio of the ADBS gearbox/transmission 2.

The "impulse method" can be used either to increase the speed (rpm) of the wind turbine rotor blade assembly 7 to a required setting or to provide steady state operation by maintaining the speed of the wind turbine rotor blades 7 at a constant setting. When the "impulse method" is in use, the speed (rpm) of the wind turbine rotor blade assembly 7 is allowed to increase when the power impulses are applied and decrease when the power impulses are stopped. However, the minimum speed (rpm) of the wind turbine rotor blade assembly 7 is not allowed to fall below the "cut-out speed".

The acceleration rate of the wind turbine rotor blade assembly 7 that occurs when the "impulse method" is used is arranged to stay within the design requirements of the wind turbine rotor blade assembly 7 and the other wind turbine components. This is necessary to prevent the forces and loads that the acceleration creates from overstressing and damaging the rotating wind turbine rotor blade assembly 7 and other wind turbine components.

The sequence of operation for the "impulse method" is:
A) The auxiliary drive/brake system 100 is started when the rpm of the wind turbine rotor blade assembly 7 is close to falling below the "cut-off speed" needed for the wind turbine 200 to remain in operation.
B) The auxiliary drive/brake system 100 is operated to raise the operating rpm of the wind turbine rotor blade assembly 7 to 2-4 rpm above the "cut-out speed" or to maintain it at a constant speed above the cut out speed.
C) The number of "impulses" and the time duration of each "impulse" applied by the auxiliary drive/brake system 100 during this stage can vary depending on the wind conditions present, the wind turbine size and the design of the auxiliary drive/brake system components.
D) The auxiliary drive/brake system 100 can be stopped once the wind turbine rotor blade assembly 7 is operating at the required rpm or remain ready for further use.

If necessary, the entire impulse operation process can be repeated if a longer period of impulse operation is required based on the available wind speed.

Figure 8:
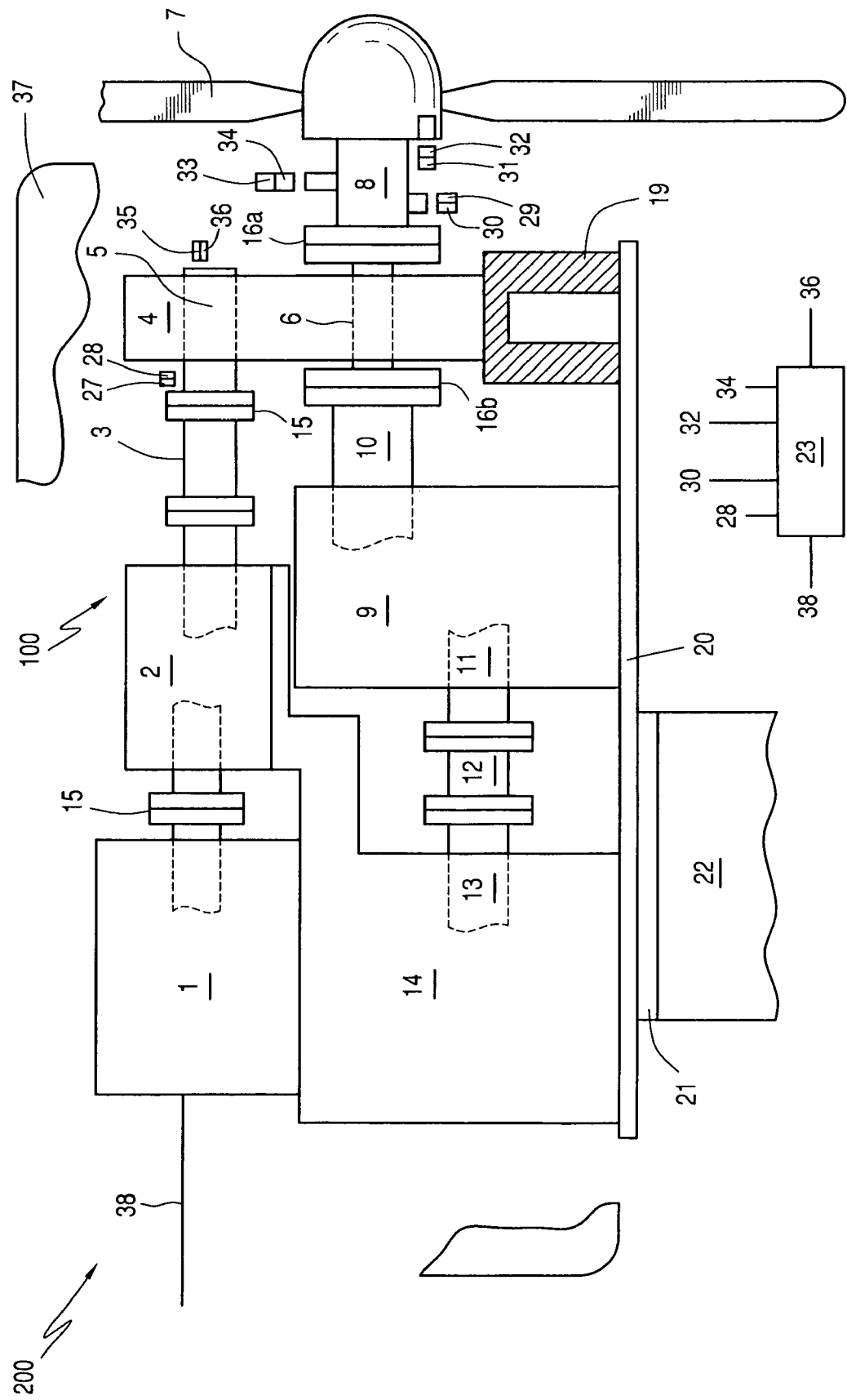

In accordance with embodiments not employing a clutch assembly 26 as shown with reference to FIG. 8, when auxiliary drive/brake system 100 is not in use, high torque motor 1, the ADBS gearbox/transmission 2, the ADBS driveshaft 3 and the ADBS transfer gearbox 4 are turned freely ("back driven") by the wind turbine low-speed shaft 8 when the wind turbine rotor blade assembly 7 operates by wind. However, and in accordance with an optional embodiment as shown with reference to FIGS. 2, 3, 4 and 9, a powered clutch assembly 26 is added to either the ADBS gearbox/transmission 2 (see FIGS. 2, 4 and 9) or the ADBS transfer gearbox 4 (see FIG. 3) if it is desired to physically disengage the ADBS gearbox/transmission 2 and the high torque motor 1 from the wind turbine 200. The installation of the clutch assembly 26 prevents the ADBS drive train components from being turned ("back driven") by the wind turbine low-speed shaft 8 when the wind turbine 200 is being operated by wind only and the auxiliary drive/brake system 100 is not in service.

As discussed above, a traditional wind turbine 200, for example, one which may be used in conjunction with the present auxiliary drive/brake system 100 is composed of wind turbine rotor blades 7 connected to the wind turbine low-speed shaft 8. The wind turbine low-speed shaft 8 drives the wind turbine gearbox 9 by means of the input shaft 10 of the wind turbine gearbox 9. The output shaft 11 of the wind turbine gearbox 9 is connected to and drives the wind turbine high-speed shaft 12. The wind turbine high-speed shaft 12 connects to the input shaft 13 of the wind turbine generator 14. The wind turbine generator 14 produces the electricity that is supplied to the power company electricity transmission network. The wind turbine rotor blades 7 are powered by wind only. This restricts the wind turbine generator 14 because it can only produce electricity when wind is available to turn the wind turbine rotor blades 7 at the required rpm (shaft speed) steadily and reliably.

The yaw control mechanism 31 is used to position the wind turbine rotor blades 7 to further engage or disengage the wind, the input shaft brake mechanism 33, provided the wind turbine 200 is equipped with it, is used to slow the wind turbine low-speed shaft 8 and the wind turbine rotor blades 7 if these rotate above the maximum allowable rpm (shaft speed). The wind turbine gearbox 9 and the wind turbine generator 14 are installed on the base plate 20. The base plate 20 is attached to the wind turbine tower 22 by the rotating joint 21. The rotating joint 21 allows the wind turbine 200 to rotate in the horizontal plane (yaw) about the wind turbine tower 22 whenever the wind changes direction. The wind turbine nacelle 37 covers and protects the internal components of the wind turbine 200. The auxiliary drive/brake system 100 is arranged to enable it to rotate with the wind turbine nacelle 37 when it rotates (yaws) with the change in wind direction.

The installation of the present auxiliary drive/brake system 100 for use in conjunction with a wind turbine 200 as described above enables the wind turbine 200 to generate a portion of its rated Megawatt output reliably whenever the wind speed drops rapidly or becomes too intermittent to enable normal wind only operation.

More particularly, and with reference to the various embodiments disclosed in FIGS. 2, 3, 4, 8 and 9, as briefly discussed above, the auxiliary drive/brake system 100 includes a high torque motor 1, an ADBS gearbox/transmission 2, an ADBS transfer gearbox 4, an ADBS driveshaft 3, a support frame 18, 19 and a control system 23. The high torque motor 1, the ADBS gearbox/transmission 2 and ADBS transfer gearbox 4 form an independent powered drive train ("ADBS drive train") that connects to and operates the wind turbine low-speed shaft 8 and the wind turbine gearbox 9.

The support frame 18, 19 supports these parts within the wind turbine nacelle 37. The ADBS drive train is located within the wind turbine nacelle 37. The potential locations for the ADBS drive train include above, below or to one side of the wind turbine generator 14 and the wind turbine gearbox 9. The wind turbine low-speed shaft 8 is the "input shaft" that connects the wind turbine rotor blades 7 to the wind turbine gearbox 9, which connects to and operates the wind turbine generator 14. The auxiliary drive/brake system 100 is arranged to enable it to rotate with the wind turbine nacelle 37 when it rotates (yaws) with the change in wind direction.

When the auxiliary drive/brake system 100 is used to drive the wind turbine 200, the motor drive control system 23 controls and operates the high torque motor 1 to drive the ADBS gearbox/transmission 2, the ADBS driveshaft 3, and the ADBS transfer gearbox 4. The torque and horsepower created by the present auxiliary drive/brake system 100 is transferred into the wind turbine low-speed shaft 8 where it combines with the torque and horsepower created by the wind acting on the wind turbine rotor blades 7. The combined torque and horsepower is transferred from the wind turbine low-speed shaft 8 into the wind turbine gearbox 9 and the wind turbine generator 14. This causes the wind turbine generator 14 to operate and produce electricity in the normal manner. The electricity is supplied to the power company by the existing electricity transmission line network.

The input shaft of the ADBS gearbox/transmission 2 receives the input torque and horsepower from the high torque motor 1. The output shaft connects to the ADBS driveshaft 3 if this is used (see FIGS. 2, 3, 8 and 9). The ADBS driveshaft 3 connects the output shaft of the ADBS gearbox/transmission 2 to the ADBS transfer gearbox 4. The ADBS transfer gearbox 4 transfers the output rpm, torque and horsepower from the ADBS gearbox/transmission 2 to the wind turbine low-speed shaft 8. The ADBS driveshaft 3 connects to and drives the input shaft 5 of the ADBS transfer gearbox 4. The output shaft 6 of the ADBS transfer gearbox 4 connects to and drives the wind turbine low-speed shaft 8. Suitable drive couplings 15 are fitted to the high torque motor 1, the ADBS gearbox/transmission 2, the ADBS driveshaft 3 and the ADBS transfer gearbox 4 to enable these components to be installed and removed for maintenance. The ADBS transfer gearbox 4 is located on the wind turbine low-speed shaft 8 between the wind turbine rotor blade assembly 7 and the wind turbine gearbox 9.

The arrangement and attachment of the ADBS transfer gearbox 4 onto the wind turbine low-speed shaft 8 is achieved by one of the following methods. In accordance with a first embodiment as shown with reference to FIG. 2, one side of the output shaft 6 of the ADBS transfer gearbox 4 is attached to the wind turbine low-speed shaft 8 by the first drive coupling 16*a*. The opposite side of the output shaft 6 of the ADBS transfer gearbox 4 is attached by the second drive coupling 16*b* directly to the input shaft 10 of the wind turbine gearbox 9. In accordance with the embodiment disclosed in FIG. 3, the ADBS transfer gearbox 4 is built into the ADBS gearbox/transmission 2 and made integral with it. Referring now to the embodiment disclosed with reference to FIG. 4, the ADBS transfer gearbox 4 is built directly into the wind turbine gearbox 9 and made integral with it. The input shaft 10 of the wind turbine gearbox 9 is arranged to also serve as the output shaft 6 of the ADBS transfer gearbox 4. The ADBS driveshaft 3 either is not used or is incorporated into the ADBS gearbox/transmission 2. The first drive coupling 16*a* is used to attach the wind turbine low-speed shaft 8 to the combined input shaft 10 of the wind turbine gearbox 9/output shaft 6 of the ADBS transfer gearbox 4. The second drive coupling 16*b* is not used.

The high torque motor 1 and the ADBS gearbox/transmission 2 are supported by and fastened to the support frame 18 which is fastened to the base plate 20. The support frame 18 is installed in and enclosed within the wind turbine nacelle 37. The ADBS transfer gearbox 4 is fastened to the base plate 20 or to the support frame 19 if this arrangement is required. When the support frame 19 is used, it is fastened to the base plate 20. An alternate arrangement to support the high torque motor 1 and the ADBS gearbox/transmission 2 are to fasten these components directly to the wind turbine generator 14 either with or without the support frame 18.

The preferred arrangement and location of the high torque motor 1, the ADBS gearbox/transmission 2 and the ADBS transfer gearbox 4 within the wind turbine nacelle 37 is to position these in a straight longitudinal line above the wind turbine generator 14 and the wind turbine gearbox 9 and close to the vertical centerline (vertical axis) of the wind turbine tower 22. The benefit of this arrangement is it reduces the cantilever bending load the ADBS component weights and loads create on the wind turbine 200 and the wind turbine tower. This arrangement is shown in each of the embodiments disclosed with reference to FIGS. 2, 3, 4, 7, 8, and 9.

The following alternate arrangements for the location of the ADBS drive train components also can be used: locate all or some of the ADBS drive train components below the wind turbine base plate and position them in a straight longitudinal line; locate all or some of the ADBS drive train components (the high torque motor, the ADBS gearbox/transmission and the ADBS transfer gearbox) along the side of the wind turbine components and at the same elevation; or locate one or more of the ADBS drive train components in either the vertical plane or at an angle and either above or below the wind turbine components.

The control panels, equipment housings and power supply that compromise the motor drive control system 23 are installed within the wind turbine nacelle 37, or the wind turbine tower 22, or at a convenient location on the ground as required.

Figure 7:
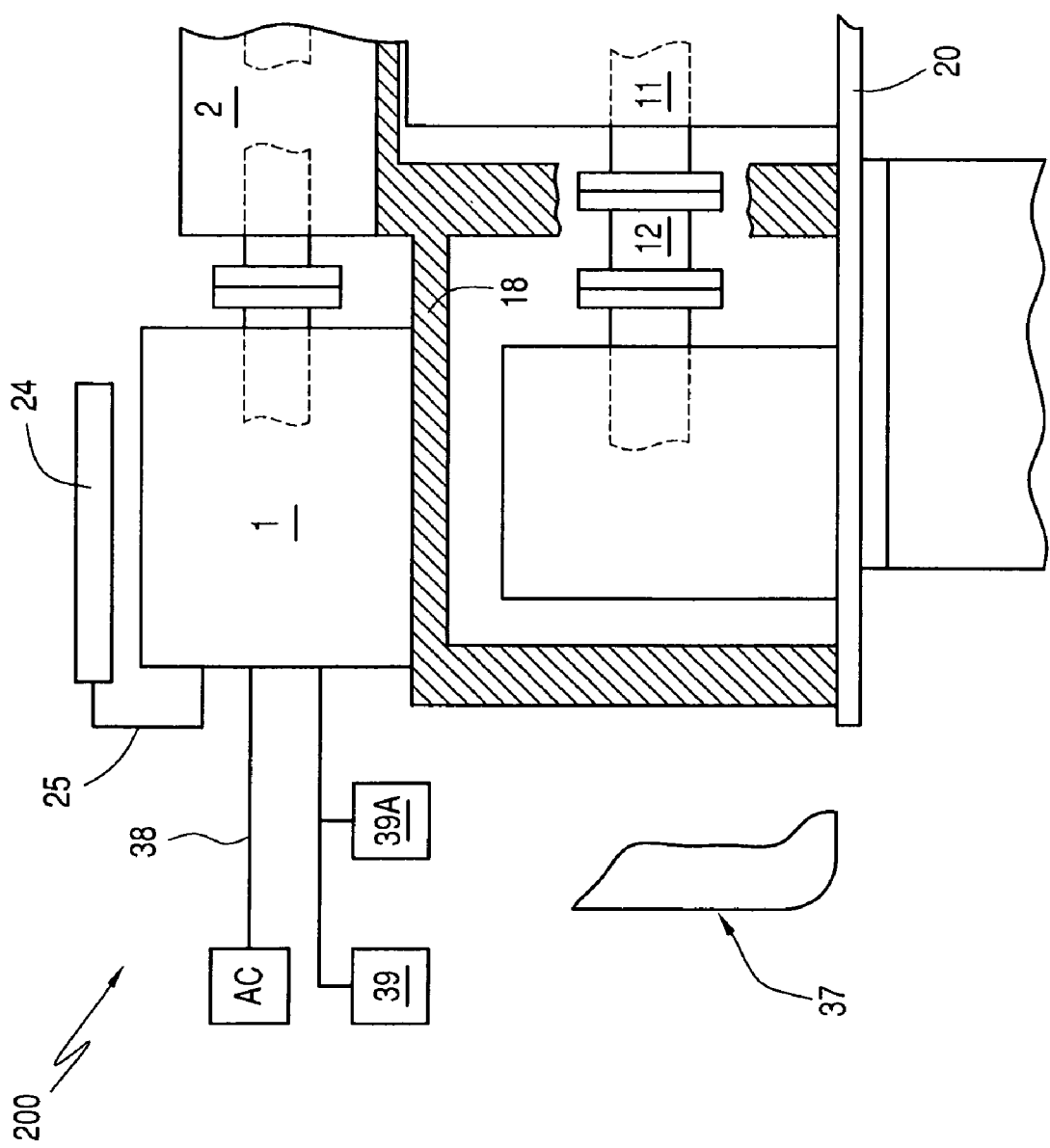

If the auxiliary drive/brake system 100 is arranged to provide dynamic braking by using the electric-type high torque motor 1, the following parts and arrangement are used. Referring to FIG. 7, the exterior of the wind turbine nacelle 37 is equipped with a series of resistors to form the resistor grid 24. The resistor grid power cable 25 connects the resistor grid 24 to the electric-type high torque motor 1. The control system 23 is arranged to reverse the electric field on the electric-type high torque motor 1 and cause it to operate as a generator. This occurs only when the dynamic braking system is used. The electricity created by the electric-type high torque motor 1 when it operates as a generator is directed to the resistor grid 24 by the resistor grid power cable 25. The resistor grid 24 converts the electricity to heat and dissipates it into the air at the exterior of the wind turbine nacelle 37.

The high torque motor 1 is designed to have a low operating speed. The high torque motor 1 is designed to start and stop repeatedly and to operate for repeated limited time periods under high load. The high torque motor 1 is designed to operate during start up for repeated but limited time periods while producing high torque. The maximum torque value the high torque motor 1 could produce would be close to the "locked rotor" value or "full stall" valve.

Figure 6:
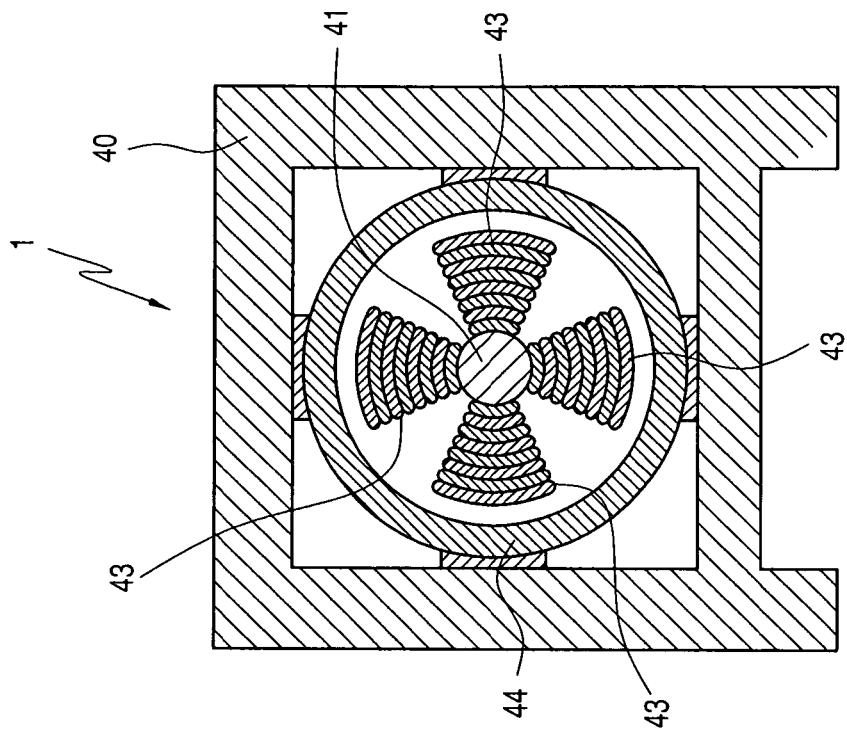
FIGS. 5 and 6 are respectively a longitudinal cross sectional view and a lateral cross sectional view of the high torque motor employed in accordance with a preferred embodiment of the present invention.
Figure 5:
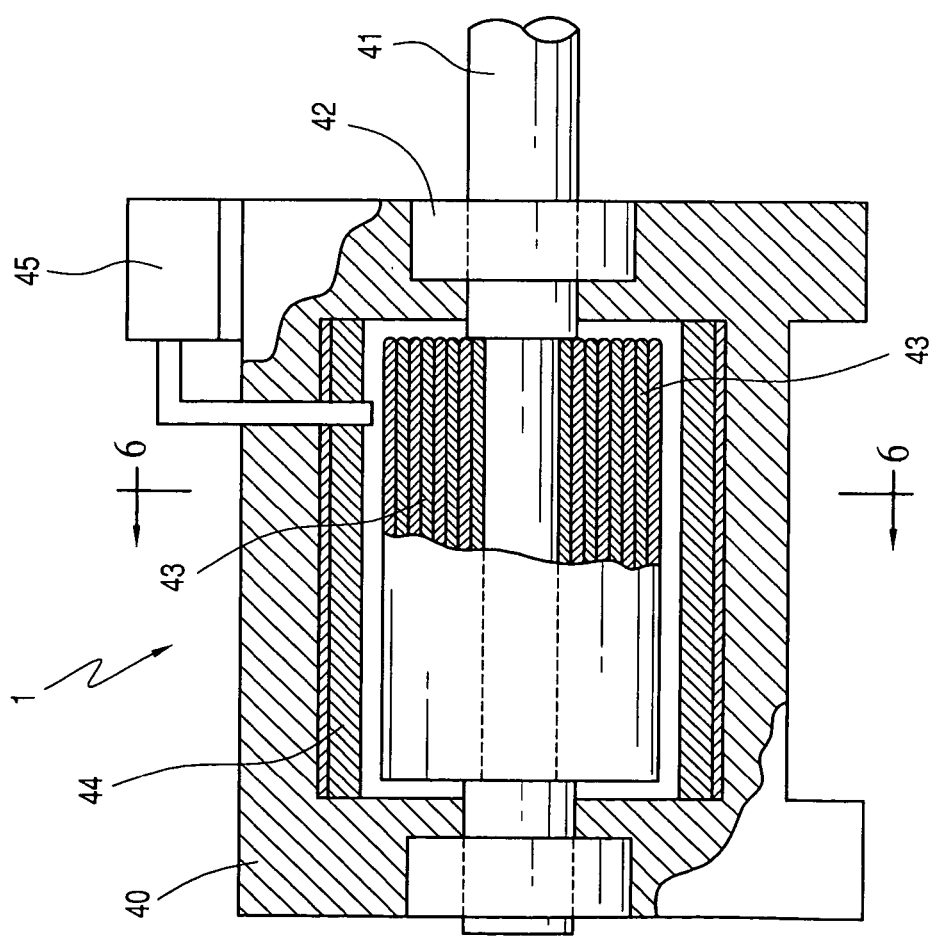

In accordance with a preferred embodiment of the present invention, and with reference to FIGS. 5 and 6, the present high torque motor 1 is electric and includes a lightweight high strength frame 40. In accordance with a preferred embodiment, the frame 40 is constructed from high strength steel or the like. The high torque electric motor 1 also includes a motor shaft 41 rotatably mounted upon the frame 40. As is discussed in greater detail below, the motor shaft 41 is 20% larger than comparable motor shafts and of similar improvements in strength. In view of the added loads applied to the motor shaft 41, the bearings 42 supporting the motor shaft 41 relative to the frame 40 are selected to handle the increased load contemplated during operation of the present high torque electric motor 1. The rotor windings 43 are secured about the motor shaft 41 and work in conjunction with the motor stator 44 of the motor 1 to drive the present motor 1. The arrangement of the rotor windings 43 allows the motor 1 to run at lower speeds while the strengthened construction of the motor shaft 41 and bearings 42 allows the motor 1 to handle higher temperatures and loads, and are also arranged to allow for lower operating motor speeds while used in conjunction with the rotors of the present motor 1.

All motor parts are designed to operate in the overload range for repeated limited time periods. In addition, all motor parts are designed to operate with and dissipate the heat generated created by the repeated start/stop operation.

The use of a separate forced air convection cooling system 45 to cool the motor provides rapid and controlled removal of the heat created each time the high torque motor 1 is started up. This separate forced air convection motor cooling system 45 would contain its own cooling fan and it would be powered by its own electric motor.

More particularly, and in accordance with a preferred embodiment of the present invention when the high torque motor 1 is electrically powered, the high torque electric motor 1 is either a special design AC motor or a special design DC motor specifically designed to offer operation in accordance with the methodologies described herein. For example, the high torque AC or DC electric motor in accordance with the present invention is designed to operate during start-up for repeated but limited time periods while producing high torque. The operation of the motor is at high torque in excess of a standard equivalent motor. The motor is modified so that the shaft rpm is run at a slower speed than the standard motor to maximize torque. The actual rpm depends upon the motor size. The motor frame is strengthened by using lightweight fabricated steel.

Some of the differences between a standard AC and DC electric motor to the present high torque electric motor 1 include the fact the standard electric motor is limited to being restarted only a small number of times (such as 2 or 3 times) each day in order to prevent overheating and failure of its armature windings and other internal components. In addition, the maximum torque the standard electric motor can produce during start-up is lower and the time period over which it can produce the maximum torque is shorter. Also, the design of the standard electric motor is arranged for continuous operation while producing its normal rated torque and horsepower. The present high torque electric motor 1 is designed for short periods of operation during which it produces high values of torque that exceed the rating of a standard electric motor of comparable size.

The types of AC motors from which the high torque electric motor 1 can be made include (but are not limited to) the induction type, the synchronous type, and the polyphone type. The types of DC motors include (but are not limited to) the series-wound type, the shunt-wound type and the compound wound type. The output shaft of the high torque electric motor 1 connects to and powers the ADBS gearbox/transmission 2. As discussed above, the high torque electric motor 1 can be replaced by a hydraulic motor as an alternative arrangement.

In accordance with a preferred embodiment of the present invention, and with reference to FIG. 7, it is contemplated the present high torque electric motor 1 may be powered in one or more of the following manners. For example, the present high torque electric motor 1 may be powered by AC electric power delivered from the power company by the AC power supply line 38. The present high torque electric motor 1 may also be powered by DC electric power supplied by the storage batteries 39. The storage batteries would be located either at the wind turbine 200 or in a remote location. If necessary, the DC power could be converted to AC power by auxiliary equipment. The storage batteries 39 can be arranged to be recharged by a portion of the electricity generated by the wind turbine 200 when it is in operation by use of suitable recharging equipment. This method increases the "green nature" of the auxiliary drive/brake system 100 by eliminating use of electric power delivered separately by the power company. The present high torque electric motor 1 may also be powered by DC electric power created by converting the AC electric power delivered by the AC power supply line 38.

The electric cables from the AC power supply line 38 or storage batteries 39 that supply the AC or DC electric power to the high torque electric motor 1 are arranged to rotate with the wind turbine nacelle 37 when it rotates (yaws) about the wind turbine tower 22 whenever the wind changes direction.

Figure 9:
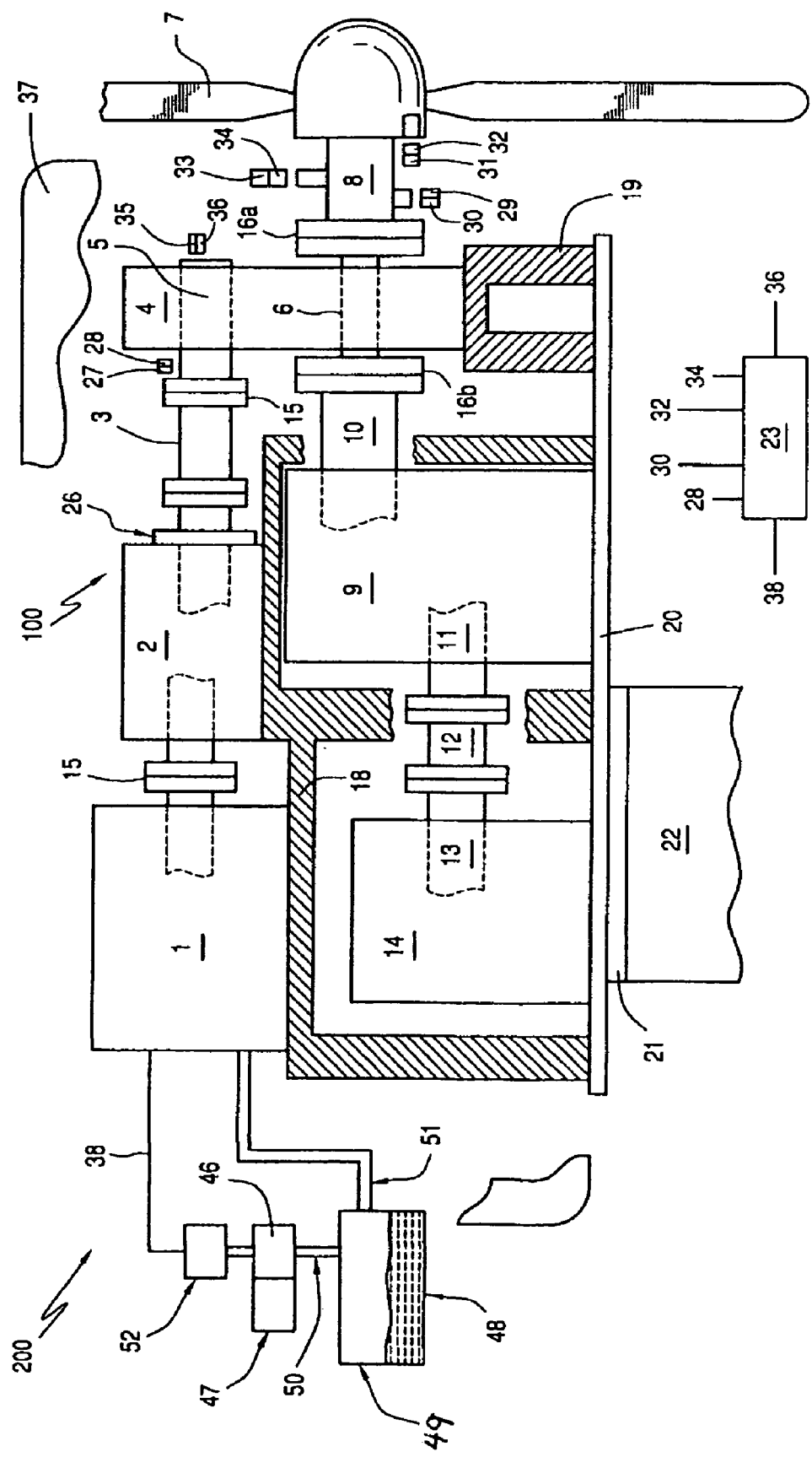

In accordance with an alternate embodiment, and with reference to FIG. 9, the high toque motor 1 may be a hydraulic-type high torque motor, in particular, a low speed high torque hydraulic motor system. The hydraulic-type high torque motor 1 is also designed to be started and stopped repeatedly and to operate for repeated limited time periods under high load.

In accordance with a preferred embodiment as shown with reference to FIG. 9, the hydraulic-type high torque motor 1 can be either a piston type motor or a vane type motor. The output shaft connects to and powers the ADBS gearbox transmission 2. The power and speed of the hydraulic-type high torque motor 1 is controlled by an adjustable throttle valve 52 that is actuated by the motor drive control system 23. The hydraulic-type torque motor is powered by hydraulic fluid 48 supplied to it by the hydraulic pump 46. The hydraulic pump 46 is powered by a separate AC or DC electric motor 47. The electric cables that supply the AC or DC electric power to the electric motor are arranged to rotate with the wind turbine nacelle 37 when it rotates (yaws) about the wind turbine tower 22 whenever the wind changes direction. The hydraulic fluid 48 is contained in the supply tank 49. The supply tank 49 and the hydraulic pump 46 can be located external from the wind turbine nacelle 37. These locations include below the wind turbine nacelle 37 and to one side of the wind turbine nacelle 37. The hydraulic fluid 48 is delivered to the hydraulic pump 46 by the supply line 50. The hydraulic pump 46 sends the hydraulic fluid 48 through the adjustable throttle valve 52 and power supply line 38 to the hydraulic-type high torque motor 1. For this application the power supply line 38 functions as part of the hydraulic system.

The return line 51 returns the hydraulic fluid 48 from the hydraulic pump 46 to the supply tank 49. The supply line 50, the power supply line 38, the return line 51 and all other hydraulic components consist of high-strength hydraulic piping and components. The entire hydraulic system is arranged to rotate with the wind turbine nacelle 37 when it rotates (yaws) on the wind turbine tower 22 with the change in wind direction.

The following motor types can be used as an alternate method to power the auxiliary drive/brake system 100:

- A motor operated by compressed air or another compressed gas. The motor types include reciprocating and rotary. The reciprocating types include the simple expansion, compound expansion, single acting and double acting types.
- A reciprocating steam engine. This includes engines of the simple expansion, compound expansion, single acting and double acting types. It would be powered by a steam source such as live steam or waste steam that operates a separate industrial or power process.
- An internal combustion motor. Suitable motor types and fuels include diesel, gasoline and/or compressed hydrocarbon gases such as methane and natural gas.
- A Stirling cycle motor.
- A steam turbine or a combustion turbine.

Regardless of whether an electric high torque motor or a hydraulic-type high torque motor, the high torque motor 1 connects directly to the ADBS gearbox/transmission 2 by use of suitable drive couplings 15. The ADBS gearbox/transmission 2 is a separate gearbox or transmission. It contains the gearing, the input shaft, and the output shaft. The input shaft receives the input torque and horsepower from the high torque motor 1. The output shaft connects to the ADBS driveshaft 3. As such, the gearbox/transmission 2 reduces the high torque motor 1 rpm to within the speed range of the wind turbine low-speed shaft 8. It also multiplies the torque created by the high torque motor.

The ADBS gearbox/transmission 2 is preferably arranged as either a single gearbox/transmission or as two separate gearbox transmissions that are coupled together to work either in series or parallel a gearbox that uses fixed ratio gearing. The gear ratio of the ADBS gearbox/transmission 2 is based upon the operating rpm of the high torque motor and speed of the wind turbine rotor blades 7 and wind turbine low-speed shaft 8 that the present system is required to provide. The ADBS gearbox/transmission 2 is equipped with its own lubrication system or is connected to the lubrication system used on the wind turbine gearbox 9. The gear arrangement is preferably between 1 to 4 reduction stages. The ADBS gearbox/transmission components are designed for high load, low speed operation with multiple teeth engagement to distribute the loading and reduce the contact stress. The gear shafts are supported by high load rolling element bearings. The bearings and gears are lubricated by oil bath or a forced oil lubrication system.

It is contemplated the ADBS gearbox/transmission 2 may also be one of the following gearbox types:

- A gearbox that uses a fixed ratio gearing. The gear arrangement can be double reduction, triple reduction or another type.
- A gearbox that uses a fixed ratio roller chain and sprocket drive.
- A variable speed transmission that uses a drive belt and adjustable pulley arrangement. The design is arranged for variable speed using automatic and/or manual shifting.
- A variable speed automatic transmission that uses changeable synchromesh gearing. The gearing is arranged to change using an automatic or manual shifting mechanism.

In accordance with a preferred embodiment, and as briefly discussed above, a powered clutch assembly 26 is added to the ADBS gearbox/transmission 2 if it is desired to disengage the ADBS gearbox/transmission 2 and the high torque motor 1 from the wind turbine 200. See FIGS. 2, 3, 4 and 9 for embodiments employing the powered clutch assembly 26. The clutch assembly 26 prevents the ADBS drive train components from being turned ("back driven") by the wind turbine low-speed shaft 8 when the wind turbine 200 is being operated by wind only and the auxiliary drive/brake system 100 is not in service.

The ADBS driveshaft 3 connects the output shaft of the ADBS gearbox/transmission 2 to the ADBS transfer gearbox 4. The ADBS driveshaft 3 is fitted with suitable drive couplings 15 to enable it, the ADBS gearbox/transmission 2, and the ADBS transfer gearbox 4 to be installed and removed for maintenance.

The ADBS transfer gearbox 4 is a separate gearbox that contains the input shaft 5 of the ADBS transfer gearbox 4 and the output shaft of the ADBS transfer gearbox 6. The gear shafts are supported by high load rolling element bearings. The bearings and gears are lubricated by oil bath or a forced oil lubrication system. All drive parts are designed for high load, low speed operation. The ADBS transfer gearbox 4 transfers the output rpm, torque and horsepower from the ADBS gearbox/transmission 2 to the wind turbine low-speed shaft 8 without changing values. However, it can be arranged to provide further speed reduction and torque multiplication should this be necessary. The ADBS driveshaft 3 connects to and drives the input shaft 5 of the ADBS transfer gearbox 4. The output shaft 6 of the ADBS transfer gearbox 4 connects to and drives the wind turbine low-speed shaft 8.

The gear ratio of the ADBS transfer gearbox 4 can be arranged for direct transfer of the output rpm, torque and horsepower from the ADBS gearbox/transmission 2 or to provide an additional rpm reduction and torque multiplication of it. In accordance with a preferred embodiment, the ADBS transfer gearbox 4 is a gearbox that uses fixed ratio gearing.

In accordance with alternate embodiments, it is contemplated the ADBS transfer gearbox 4 may be one of the following gearbox types:

- A gearbox that uses a fixed ratio roller chain and sprocket drive.
- A gearbox that uses a fixed or variable ratio drive belt and pulley arrangement. The variable ratio design is arranged for variable speed using automatic and/or manual shifting.
- A variable speed automatic transmission that uses changeable synchromesh gearing. The gearing is arranged to change using an automatic or manual shifting mechanism.

The ADBS transfer gearbox 4 is located on the wind turbine low-speed shaft 8 between the wind turbine rotor blades 7 and the wind turbine gearbox 9. If it is desired to disengage the ADBS gearbox/transmission 2 and the high torque motor 1 from the wind turbine 200, the powered clutch assembly can be added to the ADBS transfer gearbox 4 instead of being placed on the ADBS gearbox/transmission 2. The installation of the clutch assembly 26 prevents the ADBS drive train components from being turned ("back driven") by the wind turbine low-speed shaft 8 when the wind turbine 200 is being operated by wind only and the auxiliary drive/brake system 100 is not in service.

The ADBS driveshaft 3 is used when the ADBS gearbox/transmission 2 cannot be connected directly to the ADBS transfer gearbox 4. The ADBS driveshaft 3 can be a one-piece or multiple piece arrangement. It is fitted with suitable drive couplings 15 to enable it and the other components to be installed and removed for maintenance. It also can be fitted with universal/flexible joints should the use of these be necessary.

The high torque motor 1 and the ADBS gearbox/transmission 2 are supported by and fastened to the support frame 18 which is fastened to the base plate 20. The support frame 18 of the ADBS motor & gearbox is installed in and enclosed within the wind turbine nacelle 37.

The ADBS transfer gearbox 4 is fastened to the base plate 20 or to the support frame 19 of the ADBS transfer gearbox 4 as required. When the support frame 19 of the ADBS transfer gearbox 4 is used, it is fastened to the base plate 20 to form a solid base and is arranged to fit over, alongside, around or under the wind turbine generator 14 and wind turbine gearbox 9 as required. This includes installation within the wind turbine nacelle 37 or installation on the exterior of it. The support frame 18, 19 can be arranged as multiple independent structures or as a single structure depending on the arrangement required to fit the available space as on the wind turbine 200.

The special design features of the support frame 18, 19 include the fact it is made from high strength steel using bolted and/or welded construction, it can be removed when it is necessary to replace the wind turbine components during a major overhaul, and it can be arranged to support the ADBS drive train components by itself or in combination with other wind turbine components.

The motor drive control system 23 controls the high torque motor 1. The motor drive control system 23 is preferably a programmable computer controlled electronic control system. The control functions are performed by use of programmable control curves and feedback control circuits that adjust speed, torque, power and acceleration based upon instrumentation selected from the group consisting of accelerometer, tachometer, strain gauge, load cell, pressure gauge, ammeter, watt meter (form motor power), and/or voltage gauge. The control functions are actuated by a combination of electronic and mechanically actuated servos and drives. The control curves can be programmed as necessary for use with different wind turbine designs, different wind conditions and operation requirements.

The motor drive control system 23 receives the wind turbine's performance data as fixed or constant values then adjusts the speed, torque, power and acceleration created by the auxiliary drive/brake system 100 to obtain the required wind turbine performance, prevent the creation of shock loads and prevent damaging the wind turbine components by overstressing or overloading them.

The performance data furnished to the motor drive control system 23 by the wind turbine rotating components and the auxiliary drive/brake system components, and the control data generated by the motor drive control system 23 is supplied by instrumentation fitted to these components. The instrumentation includes tachometers, strain gauges, load cells and accelerometers.

The motor drive control system 23 controls the speed (rpm), torque and power developed by the high torque motor 1 and the auxiliary drive/brake system 100. This includes providing the power (torque and rotational power) to the wind turbine 200 in the forms of either multiple long or short duration power "impulses", continuous steady-state power, or power that increases to provide a controlled rate of acceleration. The motor drive control system 23 also controls the method of operation used by the auxiliary drive/brake system 100 to power the wind turbine 200. The methods of operation include "impulse operation" using a multiple long or short duration power "impulses", steady state operation using continuous steady-state power, and acceleration to a required speed (rpm) using power provided at a controlled rate of acceleration. The motor drive control system 23 also controls the rate of acceleration the auxiliary drive/brake system 100 provides to the wind turbine rotor blade assembly 7. This maintains the acceleration rate within the design limits of the wind turbine rotor blade assembly 7 and the other wind turbine components to prevent damage. It also adjusts the speed (rpm) power, and rate of acceleration of the auxiliary drive/brake system 100 to match the operating conditions of the wind turbine 200 whenever the auxiliary drive/brake system 100 is activated or removed from service. The benefit of this adjustment process is it reduces the shock load and stresses to the components of the auxiliary drive/brake system 100 and the wind turbine 200. It further enables the auxiliary drive/brake system 100 to be activated either automatically or manually whenever it is necessary for the wind turbine 200 to generate electricity after the wind speed has dropped below the minimum speed needed for normal wind-only operation. It also enables the auxiliary drive/brake system 100 to be deactivated at any time the wind conditions enable the wind turbine 200 to resume electricity generation by normal wind-only operation or be shut down.

The motor drive control system 23 also transmits the control signals, settings, rpm and other instrumentation values of the auxiliary drive/brake system 100 and the wind turbine 200 to the power company control room for display, observation and analysis. In addition, this information is arranged for display at the wind turbine site for local control and on-site evaluation of the wind turbine 200 and the auxiliary drive/brake system 100 whenever this is necessary.

If the auxiliary drive/brake system 100 is equipped with the powered clutch assembly 26 that can be installed on either the ADBS gearbox/transmission 2 or the ADBS transfer gearbox 4, the motor drive control system 23 controls the clutch assembly 26. If the auxiliary drive/brake system 100 is equipped to provide dynamic braking, the motor drive control system 23 activates and controls the dynamic braking function. If the auxiliary drive/brake system 100 is equipped with the variable speed type gearbox/transmission 2, it adjusts the gear ratio to provide the required speed.

The method by which the motor drive control system 23 controls the high torque motor 1 is dependent on the motor type. If the electric-type high torque motor is used, it is controlled by adjusting the voltage and current supplied to it. If the hydraulic-type high torque motor is used, it is controlled by adjusting the pressure and flow rate of the hydraulic fluid supplied to it. If one of the other types of motors or engines is used, control is obtained by regulating the fuel, compressed gas or steam supplied to it.

The motor drive control system 23 is also linked to the following wind turbine controls. This provides a means to adjust and control the wind turbine 200 in the event this is necessary when the auxiliary drive/brake system 100 is placed into operation, is in operation, or is removed from service:

A) Yaw control mechanism—rotor blades 31. It functions by positioning the wind turbine rotor blade assembly 7 to further engage or disengage the wind. The control signal from it is transmitted by the signal cable—yaw control mechanism 32 to the control system 23.

B) Input shaft brake mechanism 33 provided the wind turbine 200 is equipped with it. It functions by slowing the wind turbine low-speed shaft 8. The control signal from it is transmitted by the signal cable—input shaft brake 34 to the control system 23.

The motor drive control system 23 uses electronic and/or mechanical instrumentation to accomplish its control functions. This instrumentation (ADBS instrumentation) includes, but is not limited to, the following types: accelerometer, strain gauge, load cell, tachometer, pressure gauge (for hydraulic system pressure if equipped), ammeter, watt meter (for motor power), and/or voltage gauge.

The ADBS instrumentation is installed on the components of the wind turbine 200 and auxiliary drive/brake system 100 as necessary to obtain the required data and provide the required control. These locations include, but are not limited to, the following: high torque motor 1, ADBS driveshaft 3, ADBS gearbox/transmission 2, ADBS transfer gearbox 4, wind turbine rotor blade assembly 7, and the wind turbine low-speed shaft 8.

Examples of the instrumentation include the following items:
- A) Accelerometer, tachometer & strain gauge—ADBS drive shaft 27
- B) Accelerometer, tachometer & strain gauge—wind turbine low speed shaft 29
- C) Accelerometer, tachometer & strain gauge—ADBS gearbox/transmission 35

The data supplied by the ADBS instrumentation is transmitted to the motor drive control system 23 by signal cables or wireless transmitters or a combination of both. These are arranged and located as necessary. Examples of the signal cables include the following items: signal cable—ADBS drive shaft 28, signal cable—wind turbine low speed shaft 30, and signal cable—ADBS gearbox/transmission 36.

The three primary methods of operation of the auxiliary drive/brake system 100 during the following different wind conditions are listed below along with one optional method:

Primary Method #1: Wind Speed Falls Below the Speed Required for Normal Wind-only Operation When the wind speed falls below the speed required for normal wind-only operation and causes rapid and steep drop in the quantity of electricity the wind turbine 200 can produce the auxiliary drive/brake system 100 is operated to enable the wind turbine 200 to keep generating electricity for a longer period of time in order to bring a replacement electricity generation resource into operation. The longer time period provides the power company enough time to perform this task in an orderly manner to prevent an upset to its electricity transmission line system and a "blackout" or "brownout" to its customers.

The auxiliary drive/brake system 100 can be operated using one of the following methods of operation in order to keep the wind turbine 200 in service while the power company prepares the replacement electricity generation resource for use.
- A) "Impulse operation" using either multiple long duration or short duration power "impulses". The "impulse method" consists of operating the auxiliary drive/brake system 100 and high torque motor 1 in a repeated "start-stop" manner to provide multiple power "impulses" into the wind turbine rotor blade assembly 7 in order to keep these turning at a high enough speed (rpm) to enable the wind turbine generator 14 to continue to produce electricity. Each power "impulse" is created when the high torque motor 1 is started and brought up to operating speed. When the "impulse method" is used the speed (rpm) of the wind turbine rotor blade assembly 7 is allowed to increase when the power impulses are applied and to decrease when the power impulses are stopped. However, the speed (rpm) of the wind turbine rotor blade assembly 7 is not allowed to fall below the "cut-out speed" (the minimum rpm required by the wind turbine 200 to remain in operation). The "impulse method" is used to either increase the rpm of the wind turbine rotor blade assembly 7 to a required speed or to provide steady state operation by maintaining the rpm of the wind turbine rotor blades 7 at a constant speed (rpm).

The acceleration of wind turbine rotor blade assembly 7 that occurs when the "impulse" method is used is arranged to prevent overstressing and damaging the rotating wind turbine rotor blade assembly 7 and the other wind turbine components.
- B) Steady state operation by operating the auxiliary drive/brake system 100 and high torque motor 1 to produce continuous steady-state power.
- C) Acceleration using power provided at a controlled rate of acceleration. This is used to increase the rpm of the wind turbine rotor blade assembly 7 to the required speed (rpm). The acceleration rate is arranged to prevent overstressing and damaging the rotating wind turbine rotor blade assembly 7 and the other wind turbine components.

The remainder of the force needed to keep the wind turbine 200 operating is supplied by the low speed wind acting on the wind turbine rotor blade assembly 7 and by the kinetic energy remaining in the rotating wind turbine rotor blade assembly 7.

The wind turbine 200 is able to produce a portion of its electricity generation output when the auxiliary drive/brake system 100 is operating. The reason for this if the auxiliary drive/brake system 100 uses electricity either to power the electric-type high torque motor 1 or operate the electric motor that drives the hydraulic pump used with the hydraulic-type high torque motor, the electricity used to power these electric motors is supplied from the separate power supply line 38. The electricity consumed by either of these electric motors is low (does not exceed 30%) because the electric motors are of small size. This occurs because the auxiliary drive/brake system 100 is sized to produce only a portion (10%-30%) of the power needed to drive the wind turbine 200. The total net electric power produced by the wind turbine 200 when the auxiliary drive/brake system 100 is operating is the difference between the wind turbine's generation output rating at the operating speed created by the ADBS 100 minus the electricity required to operate either electric motor.

Primary Method #2: Intermittent Wind

When the wind speed is too intermittent for normal wind-only operation the auxiliary drive/brake system 100 can be operated using one of the following methods of operation. This process either will enable the wind turbine 200 to remain in service while the power company prepares a replacement electricity generation resource for use, or will enable the wind turbine 200 to remain in service until the wind speed increases to the value required for wind-only operation.

The two methods of operation for this are:
- A) "Impulse operation" using either multiple long duration or short duration power "impulses". The "impulse method" is used to either increase the rpm of the wind turbine rotor blade assembly 7 to the required speed or to provide steady-state operation by maintaining the rpm of the wind turbine rotor blades 7 at a constant speed (rpm) by use of short duration power impulses.
- B) Acceleration using power provided at a controlled rate of acceleration. This is used to increase the rpm of the wind turbine rotor blade assembly 7 to the required speed (rpm). The acceleration would occur as the wind speed drops in order to keep the wind turbine rotor blade assembly 7 rotating at a uniform speed (rpm). The acceleration rate would be arranged to prevent overstressing and damaging the rotating wind turbine rotor blade assembly 7 and the other wind turbine components.

The remainder of the force needed to keep the wind turbine 200 operating when methods of operation "A" and "B" are used is supplied by the low speed wind acting on the wind turbine rotor blade assembly 7 and by the kinetic energy that accumulates in the wind turbine rotor blade assembly after it is accelerated to its required speed.

Methods of operation "A" and "B" are essentially the same ones described in Method #1 "Wind Speed Falls Below the Speed Required for Normal Wind-Only Operation" but can be used for a longer time period based on the wind conditions. Both can be continued until the wind speed increases enough for the wind turbine 200 to resume wind-only operation or until the lack of wind requires the wind turbine 200 to be removed from service.

Primary Method #3: Wind Speed is Constant but Remains Below the Speed Required for Normal Wind-only Operation When the wind speed is constant but remains below the speed required for normal wind-only operation and prevents the wind turbine 200 from producing electricity, the auxiliary drive/brake system 100 can be operated to raise the speed (rpm) of the wind turbine rotor blade assembly 7 to the value required for normal operation and maintain it at that speed (rpm). This will enable the wind turbine 200 to be placed into operation and generate electricity until the wind speed increases to allow normal wind-only operation.

The auxiliary drive/brake system 100 can be operated using one of the following methods of operation in order to place the wind turbine 200 in normal service. The two methods of operation for this are:

A) Steady state operation by operating the auxiliary drive/brake system 100 and high torque motor 1 to produce continuous steady-state power. This method is used to maintain the rpm of the wind turbine rotor blade assembly 7 at a constant speed (rpm).

B) Acceleration using power provided at a controlled rate of acceleration. This is used to increase the rpm of the wind turbine rotor blade assembly 7 to the required speed (rpm). The acceleration rate is arranged to prevent overstressing and damaging the rotating wind turbine rotor blade assembly 7 and other wind turbine components.

The remainder of the force needed to keep the wind turbine 200 operating is supplied by the low speed wind acting on the wind turbine rotor blade assembly 7.

The wind turbine 200 is able to produce a portion of its full electricity generation output when the auxiliary drive/brake system 100 is operating. The reason for this is the auxiliary drive/brake system 100 uses electricity either to power the electric-type high torque motor 1 or operate the electric motor that drives the hydraulic pump used with the hydraulic-type high torque motor 1, the electricity used to power these electric motors is supplied from the separate power supply line 38. The electricity consumed by either of these electric motors is low because the motors are of small size. This occurs because the auxiliary drive/brake system 100 is sized to produce only a portion (10%-30%) of the power needed to drive the wind turbine 200. The total net electric power produced by the wind turbine 200 when the auxiliary drive/brake system 100 is operating is the difference between the wind turbine's generation output rating at the operating speed created by the ADBS 100 minus the electricity required to operate either electric motor.

Optional Method: High Wind Speed

The following optional method of operation can be used provided the high torque motor 1 is the electric-type and the auxiliary drive/brake system 100 and control system 23 are arranged to operate as a dynamic braking system. When the wind speed exceeds the maximum allowable wind speed the wind turbine 200 is designed to operate with the auxiliary drive/brake system 100 can be operated as a dynamic braking system to prevent the wind turbine rotor blade assembly 7 from exceeding its maximum allowable rpm. The use of dynamic braking raises the maximum allowable wind speed that the wind turbine 200 is designed to operate. The benefit this provides is it allows the wind turbine 200 to remain in operation and generate electricity instead of having to be removed from service.

If the high torque motor 1 is the electric-type, the dynamic brake force is obtained by having the electric-type high torque motor 1 operate as a generator that is back-driven by the wind turbine rotor blade assembly 7. This function is obtained by having the control system 23 reverse the electric field of the electric-type high torque motor 1. The dynamic braking force is created by the quantity of the torque and horsepower absorbed from the wind turbine rotor blade assembly 7 that is required to operate the electric-type high torque motor 1 as a generator.

The torque and horsepower absorbed from the wind turbine rotor blade assembly 7 is transferred from the wind turbine low-speed shaft 8 into the ADBS transfer gearbox 4, the ADBS driveshaft 3, the ADBS gearbox/transmission 2 and into the electric-type high torque motor 1. Referring to FIG. 7, the electricity created by the electric-type high torque motor 1 when it operates as a generator is sent to the resistor grid 24 by the resistor grid power cable 25. The resistor grid 24 is a series of resistors located on the exterior of the wind turbine nacelle 37. The resistor grid 24 converts the electricity to heat and dissipates it into the surrounding air. The dynamic braking force created by this method supplements the mechanical braking force that the input shaft brake mechanism 33 can provide. This increases the total amount of braking force available to the wind turbine rotor blade assembly 7.

As briefly discussed above, the limitation of using a motorized drive system to power a wind turbine when the wind speed drops rapidly is that the power required to operate the drive motor has to exceed the power created by the wind turbine generator otherwise the machine violates the laws of physics and becomes a "perpetual motion machine". The design and method of operation of the auxiliary drive/brake system 100 to power the wind turbine enables it to overcome these physical restrictions of a "perpetual motion machine".

This results because the size of the auxiliary drive/brake system components are limited to produce only a portion of the torque and horsepower (10%-30%) that is required to operate the wind turbine and keep it in service. The 10%/30% torque horsepower value is sufficient to accelerate the rotating wind turbine rotor blade assembly 7 a small number of rpm (2-4 rpm for example) which will produce a sizeable increase of electricity generated by the wind turbine. The reason for this is low operating speed range (rpm) of the wind turbine rotor blade assembly 7 and the steep slope of the wind turbine power generation curve enables the small 2-4 rpm increase to provide a large percentage increase of the wind turbine rotor blade assembly rpm and electricity generation. This increase is sufficient to keep the wind turbine rotor blade assembly rpm above the "cut-out speed". The "cut-out speed" is the minimum rpm required by the wind turbine to remain in operation. Whenever the wind turbine rotor blade assembly rpm falls below the "cut-out speed" the wind turbine will not produce sufficient electricity for reliable operation and is removed from service by the power company.

In addition, the acceleration rate created by the auxiliary drive/brake system 100 must be kept slow in order to prevent overload and damaging the rotating wind turbine rotor blade assembly 7 and the other wind turbine components. The remainder of the force needed to keep the wind turbine operating is supplied by the low speed wind and by the kinetic energy remaining in the rotating wind turbine rotor blade assembly 7. These factors combine to reduce the size of the auxiliary drive/brake system components and the power required operate the auxiliary drive/brake system 100.

By way of example, the performance of a typical 1.5 MW wind turbine 200 equipped with the auxiliary drive/brake system 100 is shown on Graphs #1, #2, #3 and #4.

The specifications of this example 1.5 MW wind turbine are as follows:
A) Polar moment of inertia (WK.2) of the wind turbine rotor blades 7, wind turbine gearbox 9 and wind turbine generator 14=100,000,000 lb-ft-sec$^2$. This value also includes provision for the polar moment of inertia of the auxiliary drive/brake system components.
B) The wind turbine 200 produces it full load rated output (1.5 MW) when the wind speed equals or exceeds 25 mile/hour and the operating speed (rpm) of the wind turbine rotor blades 7 equals or exceeds 10 rpm.
C) The wind turbine cut-off speed is 4 rpm. This equates to 0.6 MW of electricity generated by the wind turbine 200.
D) The wind turbine ramp up/ramp down period of operation consists of the speed range of 4 to 10 rpm. During this speed range the electricity output the wind turbine 200 is able to generate changes rapidly by either increasing or decreasing based on the change of the wind speed. The power curve for the ramp up/ramp down period of operation (4 to 10 rpm) has a steep slope and demonstrates that when the wind speed falls by 50% from the full load value (25 mph/2=12.5 mph) the wind turbine 200 can lose 80% of its generation ability (12.5 mph correlates to 0.27 MW)

The specifications of the auxiliary drive/brake system 100 fitted to it are that the ADBS gearbox/transmission 2 has a gear ratio of 45 and the high torque motor 1 is sized for 200 hp, 300 hp and 400 hp.

Graphs #1, #2, #3 and #4 illustrate the following performance of a 1.5 MW wind turbine 200 and of the auxiliary drive/brake system 100 when it is fitted to a 1.5 MW wind turbine.

Graph #1—"Power/Wind Speed Curve Of The Typical 1.5 MW Wind Turbine During The Ramp Up/Ramp Down Period Of Operation". The graph shows the quantity of electricity generated by the wind turbine 200 for different wind speeds and wind turbine rotor blades 7 speeds (rpm). It also shows the change of the quantity of electricity generated by the wind turbine 200 when the speed (rpm) of the wind turbine rotor blades 7 changes by 2-rpm increments.

Graph #2—"Time Required For ADBS High Torque Motors Of 200 Hp, 300 Hp And 400 Hp To Increase The Speed (Rpm) Of The Wind Turbine Rotor Blade Assembly From 6 To 10 Rpm During The Ramp Up/Ramp Down Period Of Operation".

Graph #3—"Torque Required By ADBS High Torque Motors Of 200 Hp, 300 Hp And 400 Hp To Increase The Speed (Rpm) Of The Wind Turbine Rotor Blade Assembly From 6 To 10 Rpm During The Ramp Up/Ramp Down Period Of Operation".

Graph #4—"Power Consumption For ADBS Motors Of 200 Hp, 300 Hp And 400 Hp When Used To Increase The Speed (Rpm) Of The Wind Turbine Rotor Blade Assembly From 6 To 10 Rpm During The Ramp Up/Ramp Down Period Of Operation". The lower curve shows the power consumption for normal operation of the high torque motor 1 and normal values for wind turbine component resistance. The upper curve shows the power consumption of the high torque motor 1 with an additional 50% overload added to account for higher wind turbine component resistance. This method is used in order to be conservative.

As shown by Graph #1, the 1.5 MW wind turbine for this example is capable of producing its nameplate (100% full load rating) of electricity only when the wind speed is sufficient to keep the wind turbine rotor blades 7 operating above 10 rpm. The minimum wind speed value required for 100% full load rating is 25 mph.

When the wind speed drops below 25 mph it causes the wind turbine rotor blades 7 speed (rpm) to fall below 10 rpm. This speed reduction causes the quantity of electricity the wind turbine 200 can generate to decrease rapidly based on the change of the wind speed because the power curve enters into the ramp up/ramp down period of operation (4 to 10 rpm).

The power curve for the ramp up/ramp down period of operation has a steep slope and demonstrates that when the wind speed falls by 50% from the full load value (25 mph/2=12.5 mph) the wind turbine can lose 80% of its generation ability (12.5 mph correlates to 0.27 MW)

The auxiliary drive/brake system 100 is designed for use when the wind turbine 200 is operating during the ramp up/ramp down period of operation.

The three primary methods of operation by which the auxiliary drive/brake system 100 can be used during the ramp up/ramp down period of operation are:
A) To increase the wind turbine rotor blades 7 speed (rpm) and electrical generation output.
B) To maintain the wind turbine rotor blades 7 speed (rpm) and electrical generation output at a steady value.
C) To slow the rate by which the wind turbine rotor blades 7 speed (rpm) and electrical generation output decreases.

Figure 10:
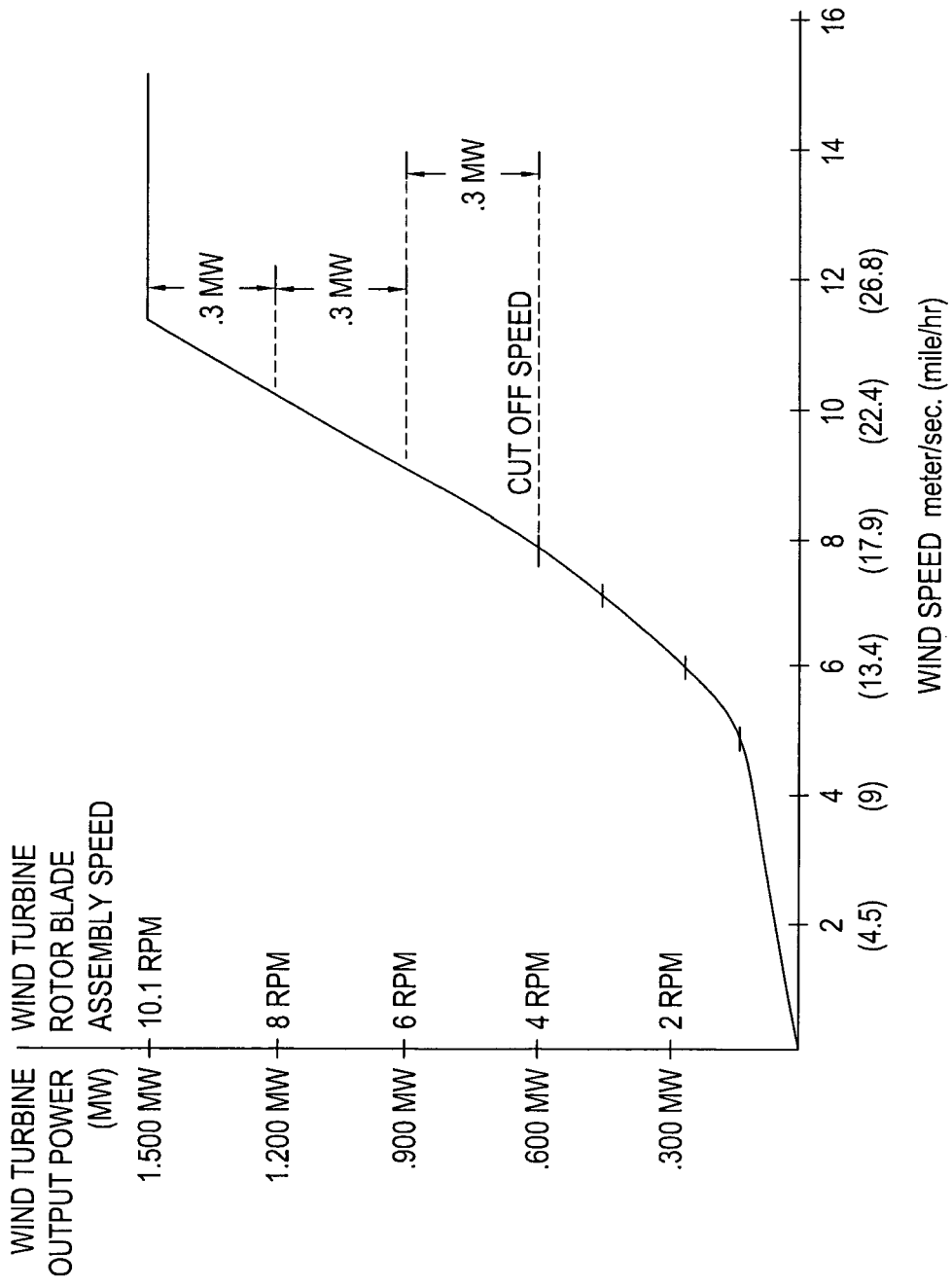
Figure 11:
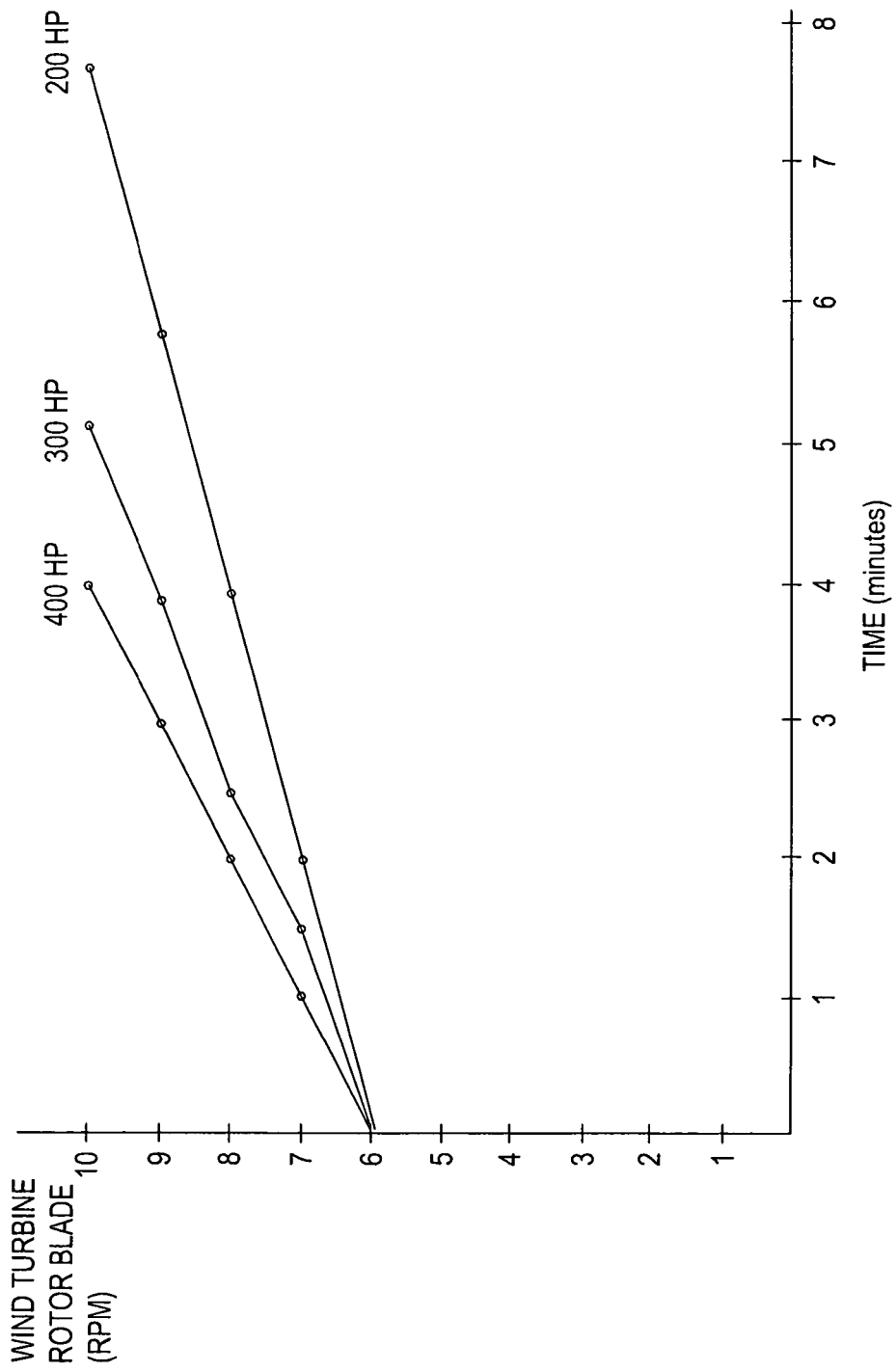
Figure 12:
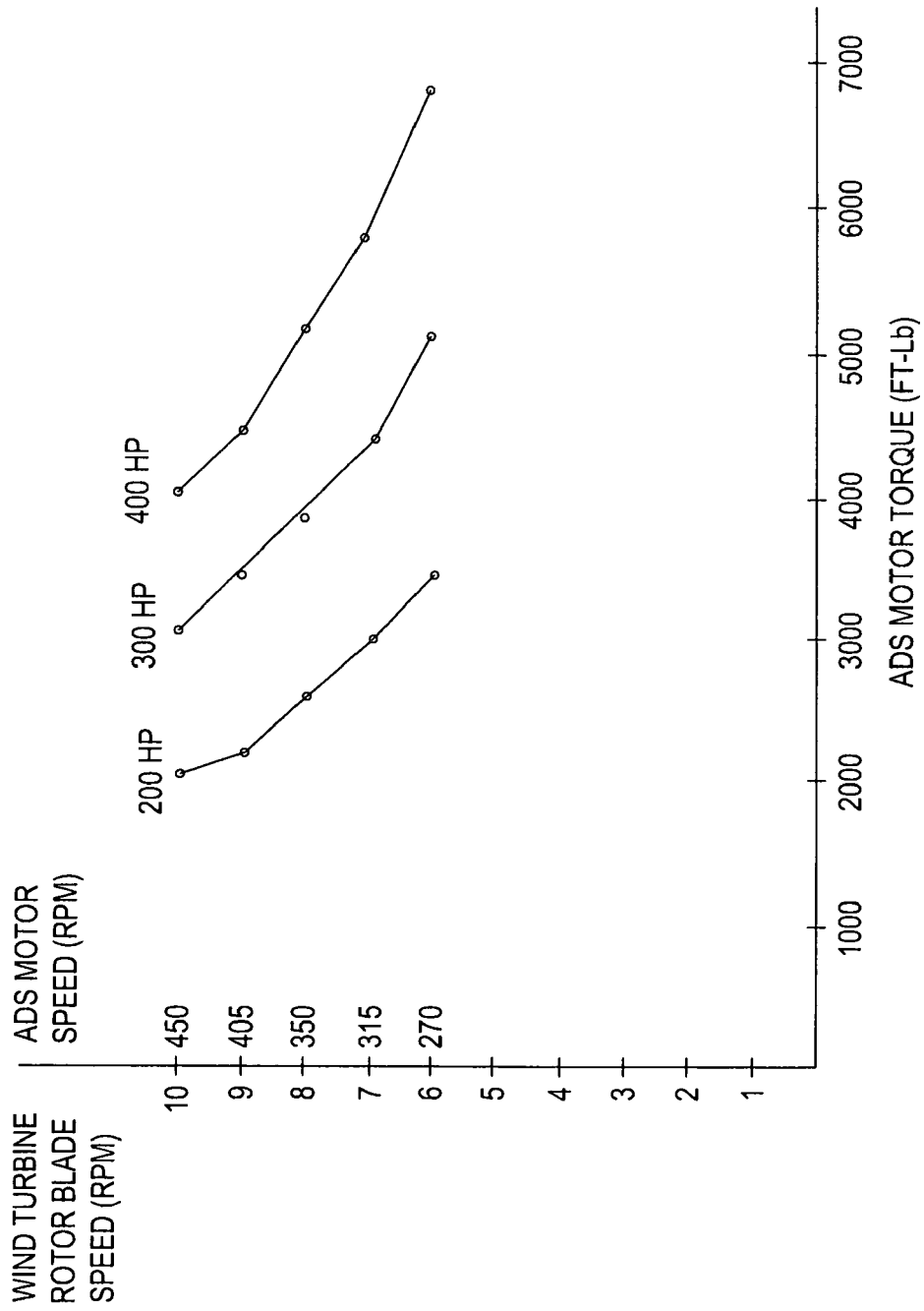

As shown in the graph #1 depicted in FIG. 10, the 1.5 MW wind turbine for this example is capable of producing its nameplate (100% full load rating) of electricity only when the wind speed is sufficient to keep the wind turbine rotor blades 7 operating above 10 rpm. The minimum wind speed value required for 100% full load rating in 25 mph.

When the wind speed drops below 25 mph, it causes the wind turbine rotor blades 7 speed (rpm) to fall below 10 rpm. This speed reduction causes the quantity of electricity the wind turbine 200 can generate to decrease rapidly because the power curve enters into the ramp up/ramp down period of operation (4 to 10 rpm).

The power curve for the ramp up/ramp down period of operation has a steep slope and demonstrates that when the wind speed falls by 50% from the full load value (25 mph/2=12.5 mph) the wind turbine can lose 80% of its generation ability (12.5 mph correlates to 0.27 MW).

As shown by Graph #1 when the auxiliary drive/brake system 100 is designed to provide a 2-rpm increase of the wind turbine rotor blades 7 speed, the speed increase will provide a 0.3 MW increase of the wind turbine electrical generation. These values are based on the wind turbine power curve shown on Graph #1.

The quantity of electric power required to operate the auxiliary drivelbrake system 100 is dependent on the following factors:
A) The type and horsepower rating of the high torque motor 1
B) The gear ratio of the ADBS gearbox/transmission 2
C) The amount of kinetic energy remaining in the wind turbine rotor blades 7 when the auxiliary drive/brake system 100 is activated
D) The amount of power available to the wind turbine 200 from the remaining wind
E) The power curve of the wind turbine 200

F) The method of operation by which the auxiliary drive/brake system 100 is used to assist the operation of the wind turbine 200

The quantity of electricity generated by the wind turbine power that is available for dispatch when the auxiliary drive/brake system 100 is in operation is variable. The factors that impact it are:
A) The design and power consumption of the auxiliary drive/brake system 100
B) The power curve of the wind turbine
C) The method of operation by which the auxiliary drive/brake system 100 is used to assist the operation of the wind turbine 200

Graph #4 shows the quantity of electric power required by the auxiliary drive/brake system 100 to operate the wind turbine 200 by itself and without any assistance from the kinetic energy remaining in the wind turbine rotor blades 7 or the remaining wind speed. The horizontal line at the 0.3 MW value serves as the base line and shows the power required to increase the wind turbine rotor blades 7 speed by 2 rpm. These values are taken from Graph #1 "Power/Wind Speed Curve Of The Typical 1.5 MW Wind Turbine During The Ramp Up/Ramp Down Period Of Operation".

The two motor power curves show the motor power (MW) required for the high torque motor 1 of sizes 200 hp, 300 hp and 400 hp. The lower motor power curve is for normal power consumption of the high torque motor 1. The upper motor power curve is for operation with the high torque motor 1 working at 50% overload.

If the auxiliary drive/brake system 100 is used to slow the rate by which the wind turbine rotor blades 7 speed (rpm) and electricity generation output decrease, the power consumption of the high torque motor 1 will be below the horizontal 0.3 MW base line. If the auxiliary drive/brake system 100 is used to maintain the wind turbine rotor blades 7 speed (rpm) and electricity generation output at a steady value without any assistance from the kinetic energy remaining in the wind turbine rotor blades 7 or the remaining wind speed, the power consumption of the high torque motor 1 will be at or close to the horizontal 0.3 MW base line. If the auxiliary drivel/brake system 100 is used to increase the wind turbine rotor blades 7 speed (rpm) and electrical generation output without any assistance from the kinetic energy remaining in the wind turbine rotor blades 7 or the remaining wind speed, the power consumption of the high torque motor 1 will be above the horizontal 0.3 MW base line.

These motor power curves will change in the event the kinetic energy remaining in the wind turbine rotor blades or the remaining wind speed is used to assist the operation of the auxiliary drive/brake system 100. To some extent, the quantity of electric power consumed by the auxiliary drive/brake system 100 over certain portions of its operating range can be reduced by use of the motor speed control system 23. This power reduction occurs because the motor speed control system 23 enables the voltage and current supplied to the electric-type high torque motor I to be adjusted to the values needed for the immediate motor operation. This allows the electric-type high torque motor 1 to operate more efficiently over its speed range.

However, the laws of physics dictate that the quantity of electric power consumed by the auxiliary drive/brake system 100 always must equal or exceed the quantity of electric power the auxiliary drive/brake system 100 is able to make the wind turbine 200 create.

Wind Turbine Generation & Electricity Consumed by the Auxiliary Drive/Brake System The quantity of electricity generated by the wind turbine power that is available for dispatch when the auxiliary drive/brake system 100 is in operation is variable. The factors that impact it are:
A) The design and power consumption of the auxiliary drive/brake system 100
B) The power curve of the wind turbine
C) The method of operation by which the auxiliary drive/brake system 100 is used to assist the operation of the wind turbine 200.

The wind turbine 200 is able to produce a portion of its electricity generation output when the auxiliary drive/brake system 100 is operating. The reason for this if the auxiliary drive/brake system 100 uses electricity either to power the electric-type high torque motor 1 or operate the electric motor that drives the hydraulic pump used with the hydraulic-type high torque motor 1, the electricity used to power these electric motors is supplied from the separate power supply line 38.

The electricity consumed by either of these electric motors is low (does not exceed 30%) because the electric motors are of small size. This occurs because the auxiliary drive/brake system 100 is sized to produce only a portion (10%-30%) of the power needed to drive the wind turbine 200. The total net electric power produced by the wind turbine 200 when the auxiliary drive/brake system 100 is operating is the difference between the wind turbine's generation output rating at the operating speed created by the ADBS 100 minus the electricity required to operate either electric motor.

Although the electric power consumed by the auxiliary drive/brake system 100 when it operates could be delivered directly to the Power Company grid instead of being used to power the auxiliary drive/brake system 100, the benefits the auxiliary drive/brake system 100 provides to the wind turbine operation are:
A) When the wind speed drops the auxiliary drive/brake system 100 keeps the wind turbine operating and producing a useful quantity of electricity.
This provides reliability to the Power company grid by either stabilizing the quantity of wind turbine 200 generated electric power sent to the Power Company transmits, or by reducing the drop off rate of wind turbine generated electric power sent to the Power Company to a value that can be matched by other Power Company electricity generation resources that are being brought into service as a replacement.
This provides the Power company more to time to adjust the electricity generation resources to handle the drop off of wind turbine generated electricity caused by the wind speed change.
B) When the wind speed increases the auxiliary drive/brake system 100 can be used to increase the wind turbine speed to a higher speed more quickly than by wind only.
This enables wind turbine 200 to react faster to a wind speed increase and can reduce the time required to place the wind turbine into service.

With the foregoing discussion in mind, the present invention offers a wide variety of advantages. These include, but are not limited to, the use of the high torque motor 1, the ADBS gearbox/transmission 2, the ADBS transfer gearbox 4 and the motor drive control system 23 to power the wind turbine 200; the design of the electric-type high torque motor 1 for repeated start/stop and "impulse" operation of the auxiliary drive/brake system 100; the arrangement and use of the electric type high torque motor 1 and the resistor grid 24 to serve as a dynamic brake for the wind turbine rotor blades 7.

The present invention allows for the use of the following types of engines and motors to operate the auxiliary drive/brake system 100:

Stirling cycle hot air engine.

Reciprocating and rotary steam engine, this includes engines of the simple expansion, compound expansion, single acting and double acting designs.

Reciprocating and rotary engine operated by compressed air or another compressed gas. This includes engines of the simple expansion, compound expansion, single acting and double acting designs.

Internal combustion engine.

Turbine engine. This includes the steam turbine and combustion turbine types.

The present invention further offers advantages by use of either storage batteries 39 or a capacitor storage system 39A (see FIG. 7) to power the electric-type high torque motor 1. Advantages are further achieved through the use and arrangement of the following auxiliary drive/brake system 100 and wind turbine components:

The use of the ADBS transfer gearbox 4 to assemble with and power the wind turbine low-speed shaft 8. See FIGS. 2-4.

The arrangement of the separate ADBS gearbox/transmission 2 and separate ADBS transfer gearbox 4. This includes use of the support frame 18, 19. See FIG. 2.

The arrangement of the combined ADBS gearbox/transmission 2 and the ADBS transfer gearbox 4. See FIG. 3.

The arrangement of building the ADBS transfer gearbox 4 directly into the wind turbine gearbox 9. See FIG. 4.

The arrangement of the ADBS gearbox/transmission 2 as two more separate gearbox transmissions that are coupled together to work in series or parallel.

Additional advantages are achieved through the use of the wind turbine generator 14 to serve as the primary support structure for the high torque motor 1 and the ADBS gearbox/transmission 2. See FIG. 9. The use and operation of the auxiliary drive/brake system 100 as a means to keep the wind turbine 200 in operation when the wind speed, wind frequency or wind intensity does not meet the requirements for wind-only operation also provides distinct advantages through the use of the present invention.

The design and use of the motor drive control system 23 to enable the auxiliary drive/brake system 100 to perform various functions provides for advantages in the present invention. The functions include automatically engaging and disengaging the operating wind turbine 200 at the same shaft speed in order to reduce the shock of the components and provide a smooth transition, performing the "impulse" method of operation and constant speed operation, performing the controlled rate of acceleration to prevent overstressing and damaging the rotating wind turbine rotor blade assembly 7 and the other wind turbine components.

Another advantage is the use of the auxiliary drive/brake system 100 to increase the minimum and maximum range of wind speed over which the wind turbine 200 can operate and produce electricity.

The present invention also provides advantages over existing technology and markets because the auxiliary drive/brake system 100 provides the following advantages to the wind turbine 200: a) it enables the wind turbine 200 to remain in operation and generate electricity for a longer period of time when the wind speed falls below the minimum wind speed required for normal wind-only operation providing the power company sufficient time to bring a replacement operation plant into operation; b) it enables the wind turbine 200 to remain in operation and generate electricity when the wind speed is too intermittent to enable normal wind-only operation increasing the operating range and daily operating period of the wind turbine 200; c) the auxiliary drive/brake system 100 enables the power company to safely dispatch more of the electricity that its wind turbines generate. This increases the revenue and the return on investment (ROI) the power company can earn from each wind turbine; d) the auxiliary drive/brake system 100 improves the stability and reliability of the power company electricity transmission line system by reducing the rapid drop or swing in electricity generation that wind turbines create whenever the wind speed drops rapidly. This reduces the potential for "blackout" and "brownout" upset or failure of the power company electricity transmission line system that result when a rapid wind turbine electricity power swing or power drop occurs.

The present auxiliary drive/brake system 100 provides the power company with the ability to reduce its use of fossil fuels for electricity generation. By reducing the use of fossil fuels the power company is able to reduce the yearly cost for fossil fuel the power company requires for operation, increase the amount of emission credits the power company can obtain and either use itself or sell trade to other power companies for profit, sell the fossil fuel it has in its inventory but does not need for electricity generation to other power companies or other industries, and reduce the need for the power company to operate its own fossil fuel power plants (this reduces the maintenance costs for the fossil fuel power generation plants owned by the power company).

The present invention also is designed such that the auxiliary drive/brake system 100 can be installed on all types of wind turbines, although the primary application is for large wind turbines of the 0.50 megawatt range and larger.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An auxiliary drive/brake system for a wind turbine, the wind turbine including wind turbine rotor blades connected to a wind turbine low-speed shaft, the wind turbine low-speed shaft drives a wind turbine gearbox via an input shaft of the wind turbine gearbox, an output shaft of the wind turbine gearbox and a wind turbine high speed shaft which connects to an input shaft of the wind turbine generator that produces electricity that is supplied to a power company electricity transmission network, wherein torque and horsepower created by the auxiliary drive/brake system are transferred into the wind turbine low-speed shaft, the torque and horsepower are transferred from the wind turbine low-speed shaft into the wind turbine gearbox and the wind turbine generator, causing the wind turbine generator to operate and produce electricity which is supplied to the power company, the auxiliary drive/brake system comprising:

a motor drive control system;

a high torque motor connected to the motor drive control system which controls the high torque motor;

a gearbox transmission;

a driveshaft; and a transfer gearbox connected to the gearbox transmission by the driveshaft, the transfer gear box connects to the wind turbine low-speed shaft and to the wind turbine gearbox;

wherein the control motor drive control system controls and operates the high torque motor to drive the gearbox transmission, the driveshaft and the transfer gearbox, the motor drive control system using programmable control curves and feedback control circuits that adjust speed, torque, power and acceleration based upon instrumentation.

2. The auxiliary drive/brake system according to claim 1, further including a dynamic braking system.

3. The auxiliary drive/brake system according to claim 1, further including either a battery or capacitor storage system powering the high toque motor.

4. The auxiliary drive/brake system according to claim 1, further including a clutch assembly.

5. The auxiliary drive/brake system according to claim 1, wherein gearbox transmission is a gearbox using fixed ratio gearing.

6. The auxiliary drive/brake system according to claim 1, wherein the transfer gearbox is connected to the wind turbine low-speed shaft by a first drive coupling and an opposite side of the transfer gearbox is attached to the input shaft of the wind turbine gearbox by the second drive coupling.

7. The auxiliary drive/brake system according to claim 1, wherein the transfer gearbox is built directly into the gearbox transmission.

8. The auxiliary drive/brake system according to claim 1, wherein the transfer gearbox is built directly into the wind turbine gearbox.

9. The auxiliary drive/brake system according to claim 1, wherein the motor drive control system controls the high torque motor.

10. The auxiliary drive/brake system according to claim 1, wherein the motor drive control system is a programmable computer-based motor drive control system and controls the high torque motor.

11. The auxiliary drive/brake system according to claim 1, wherein the instrumentation is an accelerometer, a tachometer and a strain gauge associated with the driveshaft.

12. The auxiliary drive/brake system according to claim 1, wherein the instrumentation is an accelerometer, a tachometer and a strain gauge associated with the transfer gearbox.

13. The auxiliary drive/brake system according to claim 1, wherein the instrumentation is an accelerometer, a tachometer and a strain gauge associated with the low-speed shaft of the wind turbine.

14. The auxiliary drive/brake system according to claim 1, wherein the motor drive control system adjusts the speed, torque, power and acceleration created by the auxiliary drive/brake system to prevent creation of shock loads and prevent damage to wind turbine components by overstressing or overloading.

15. The auxiliary drive/brake system according to claim 1, wherein the auxiliary drive/brake system produces 10% to 30% of power needed to drive the wind turbine.

16. An auxiliary drive/brake system for a wind turbine, the wind turbine including wind turbine rotor blades connected to a wind turbine low-speed shaft, the wind turbine low-speed shaft drives a wind turbine gearbox via an input shaft of the wind turbine gearbox, an output shaft of the wind turbine gearbox and a wind turbine high speed shaft which connects to an input shaft of the wind turbine generator, wherein torque and horsepower created by the auxiliary drive/brake system are transferred into the wind turbine low-speed shaft, the torque and horsepower are transferred from the wind turbine low-speed shaft into the wind turbine gearbox and the wind turbine generator, causing the wind turbine generator to operate and produce electricity which is supplied to the power company, the auxiliary drive/brake system comprising:
   a motor drive control system;
   a high torque motor connected to the motor drive control system which controls the high torque motor, the high torque motor being capable of impulse operation requiring repeated starting and stopping;
   a gearbox transmission;
   a driveshaft; and
   a transfer gearbox connected to the gearbox transmission by the driveshaft, the transfer gear box connects to the wind turbine low-speed shaft and to the wind turbine gearbox;
   wherein the motor drive control system controls and operates the high torque motor to drive the gearbox transmission, the drive shaft and the transfer gearbox through the initiation of impulse operation of the high torque motor.

17. The auxiliary drive/brake system according to claim 16, wherein the high torque motor includes a forced air convection cooling system.

18. The auxiliary drive/brake system according to claim 16, wherein the high torque motor is selected from the group consisting of induction type, the synchronous type, polyphone type, series-wound type, shunt-wound type and the compound wound type.

19. The auxiliary drive/brake system according to claim 16, wherein a value of torque and horsepower created by each impulse equals a proportion of a total of the torque and horsepower required to operate the wind turbine.

* * * * *